US012619002B2

(12) United States Patent
Meliksetian et al.

(10) Patent No.: US 12,619,002 B2
(45) Date of Patent: May 5, 2026

(54) AUTOMATED ARTIFICIAL INTELLIGENCE MODEL GENERATION, TRAINING, AND TESTING

(71) Applicant: International Business Machines Corporation, Armonk, NY (US)

(72) Inventors: Estepan Meliksetian, Westchester, NY (US); Harini Srinivasan, Tarrytown, NY (US); Kewen Gu, New York, NY (US); Zhangziman Song, New York, NY (US); Rosha Pokharel, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 459 days.

(21) Appl. No.: 17/481,417

(22) Filed: Sep. 22, 2021

(65) Prior Publication Data

US 2023/0094000 A1     Mar. 30, 2023

(51) Int. Cl.
| | |
|---|---|
| *G01W 1/10* | (2006.01) |
| *G06F 18/21* | (2023.01) |
| *G06F 18/214* | (2023.01) |
| *G06N 20/20* | (2019.01) |

(52) U.S. Cl.
CPC ............. *G01W 1/10* (2013.01); *G06F 18/214* (2023.01); *G06F 18/217* (2023.01); *G06N 20/20* (2019.01)

(58) Field of Classification Search
CPC ...... G01W 1/10; G06F 18/214; G06F 18/217; G06N 20/20
See application file for complete search history.

(56) References Cited

U.S. PATENT DOCUMENTS

| | | | |
|---|---|---|---|
| 9,921,864 B2 | 3/2018 | Singaravelu et al. | |
| 10,366,346 B2 * | 7/2019 | Achin .................... | G06N 20/00 |
| 2017/0032277 A1 * | 2/2017 | Klinger ................... | G06N 5/04 |

(Continued)

OTHER PUBLICATIONS

"AI and machine learning products", Google, https://cloud.google. com/products/ai/, accessed online Sep. 2, 2021, 7 pages.

(Continued)

*Primary Examiner* — Yoshihisa Ishizuka

(74) *Attorney, Agent, or Firm* — Harrity & Harrity, LLP

(57)     ABSTRACT

Mechanisms are provided to automatically generate a machine learning (ML) computer model. The mechanisms automatically generate a plurality of aggregated dataset groups, each having original dataset(s) grouped together based on a degree of correlation between characteristics of each of the original datasets. The mechanisms automatically generate, for each aggregated dataset group, a plurality of ML computer model instances, each being a ML computer model configured with a different combination of thresholds and hyperparameters than other ML computer model instances. The plurality of ML computer model instances are executed to generate performance metric information for each ML computer model instance. The performance metric information is analyzed to select a set of ML computer model instances for the aggregated dataset. The mechanisms select one or more ML computer model instances from across all of the sets of ML computer model instances as a candidate for deployment to a decision support computing system.

20 Claims, 10 Drawing Sheets

(56) References Cited

U.S. PATENT DOCUMENTS

| | | | | |
|---|---|---|---|---|
| 2019/0097900 | A1 | 3/2019 | Rodriguez et al. | |
| 2019/0156298 | A1* | 5/2019 | Ethington | G06Q 10/0635 |
| 2019/0228362 | A1* | 7/2019 | Anagnostou | G06Q 10/0635 |
| 2020/0012962 | A1* | 1/2020 | Dent | G06N 20/00 |
| 2020/0118036 | A1* | 4/2020 | Karnagel | G06N 3/088 |
| 2020/0210824 | A1* | 7/2020 | Poornaki | G05B 23/0221 |
| 2020/0302234 | A1* | 9/2020 | Walters | G06F 16/9035 |
| 2021/0117977 | A1* | 4/2021 | Kim | G06F 18/214 |
| 2021/0192387 | A1* | 6/2021 | Benson | G06N 20/10 |

OTHER PUBLICATIONS

"AWS Deep Learning Containers", Amazon Web Services (AWS), https://aws.amazon.com/machine-learning/containers/, accessed online Sep. 2, 2021, 10 pages.

"DataRobot Named as Forbes 2021 Cloud 100 Honoree", DataRobot Inc., https://www.datarobot.com/, accessed online Sep. 2, 2021, 8 pages.

"H20 Driverless AI", H2O.ai, https://www.h2o.ai/products/h2o-driverless-ai/, accessed online Sep. 2, 2021, 14 pages.

"IBM Watson Studio", International Business Machines Corporation, https://www.ibm.com/cloud/machine-learning, accessed online Sep. 2, 2021, 15 pages.

Anonymous, "Hindcast Approach", Oceanweather Inc, Accessed on the internet on Feb. 27, 2020, 2 pages.

Anwar, Ali et al., "Improving Docker Registry Design based on Production Workload Analysis", 16th USENIX Conference on File and Storage Technologies (FAST18), Feb. 12-15, 2018, 15 pages.

Baccelli, Emmanuel et al., "Scripting Over-The-Air: Towards Containers on Low-end Devices in the Internet of Things", 2018 IEEE International Conference on Pervasive Computing and Communications Workshops (PerCom Workshops), IEEE, Mar. 19-23, 2018, 4 pages.

Elflein, Sven, "Automatic Identification of Parametric Dependencies for Performance Models", Bachelor Thesis, Universität Wurzburg, Sep. 13, 2018, 68 pages.

Guidotti, Riccardo et al., "Explaining Successful Docker Images using Pattern Mining Analysis", Federation of International Conferences on Software Technologies: Applications and Foundations, Springer, Cham, Jun. 25-29, 2018, 15 pages.

Rossi, Fabiana et al., "Horizontal and Vertical Scaling of Container-based Applications using Reinforcement Learning", 2019 IEEE 12th International Conference on Cloud Computing (Cloud), IEEE, Jul. 8-13, 2019, 10 pages.

Sosa, Roman et al., "Offloading Execution from Edge to Cloud: a Dynamic Node-RED Based Approach", 2018 IEEE International Conference on Cloud Computing Technology and Science (CloudCom), Dec. 10-13, 2018, 4 pages.

* cited by examiner

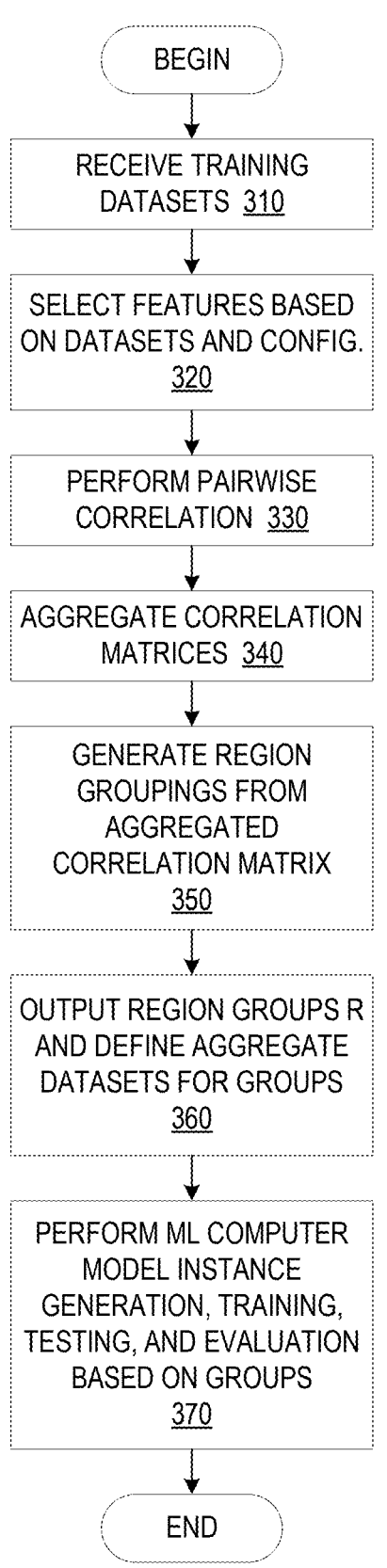

BEGIN

RECEIVE TRAINING DATASETS 310

SELECT FEATURES BASED ON DATASETS AND CONFIG. 320

PERFORM PAIRWISE CORRELATION 330

AGGREGATE CORRELATION MATRICES 340

GENERATE REGION GROUPINGS FROM AGGREGATED CORRELATION MATRIX 350

OUTPUT REGION GROUPS R AND DEFINE AGGREGATE DATASETS FOR GROUPS 360

PERFORM ML COMPUTER MODEL INSTANCE GENERATION, TRAINING, TESTING, AND EVALUATION BASED ON GROUPS 370

END

*FIG. 3*

| REGION ID | DATETIME | A | B | C | D | E | F | G | H | I |
|---|---|---|---|---|---|---|---|---|---|---|
| 1 | 12/1/2019 0:00 | 20.582432 | 28.325 | 1.334902949 | 5 | 5 | 793.0185996 | 389.707613 | 2 | 97232 |
| 1 | 12/1/2019 1:00 | 20.582432 | 28.327 | 1.334902949 | 5 | 5 | 793.0185996 | 389.707613 | 2 | 97232 |
| 1 | 12/1/2019 2:00 | 20.582432 | 28.268 | 1.334902949 | 5 | 5 | 793.0185996 | 389.707613 | 2 | 97232 |
| 1 | 12/1/2019 3:00 | 20.582432 | 28.243 | 1.334902949 | 5 | 5 | 793.0185996 | 389.707613 | 2 | 97232 |
| 1 | 12/1/2019 4:00 | 20.582432 | 28.235 | 1.334902949 | 5 | 5 | 793.0185996 | 389.707613 | 2 | 97232 |
| 1 | 12/1/2019 5:00 | 20.582432 | 28.235 | 1.334902949 | 5 | 5 | 793.0185996 | 389.707613 | 2 | 97232 |
| 1 | 12/1/2019 6:00 | 20.582432 | 28.225 | 1.319274982 | 5 | 5 | 793.0185996 | 389.707613 | 2 | 97232 |
| 1 | 12/1/2019 7:00 | 20.582432 | 28.125 | 1.243814521 | 4 | 4 | 793.0185996 | 389.707613 | 2 | 97232 |
| 1 | 12/1/2019 8:00 | 20.582432 | 27.892 | 1.127649199 | 3 | 3 | 793.0185996 | 389.707613 | 4 | 97232 |
| 1 | 12/1/2019 9:00 | 20.582432 | 26.688 | 0.606915826 | 2 | 2 | 793.0185996 | 389.707613 | 4 | 97232 |
| ⋮ | ⋮ | ⋮ | ⋮ | ⋮ | ⋮ | ⋮ | ⋮ | ⋮ | ⋮ | ⋮ |
| 1 | 12/2/2019 0:00 | 20.582432 | 0.089 | 0 | 0 | 0 | 0 | 0 | 5 | 97232 |
| 1 | 12/2/2019 1:00 | 20.582432 | 0.087 | 0 | 0 | 0 | 0 | 0 | 5 | 97232 |
| 1 | 12/2/2019 2:00 | 20.582432 | 0.080 | 0 | 0 | 0 | 0 | 0 | 5 | 97232 |
| 1 | 12/2/2019 3:00 | 20.582432 | 0.070 | 0 | 0 | 0 | 0 | 0 | 5 | 97232 |
| 1 | 12/2/2019 4:00 | 20.582432 | 0.075 | 0 | 0 | 0 | 0 | 0 | 6 | 97232 |
| 1 | 12/2/2019 5:00 | 20.582432 | 0.075 | 0 | 0 | 0 | 0 | 0 | 6 | 97232 |
| 1 | 12/2/2019 6:00 | 12.776546 | 0.075 | 0 | 0 | 0 | 0 | 0 | 6 | 97232 |
| ⋮ | ⋮ | ⋮ | ⋮ | ⋮ | ⋮ | ⋮ | ⋮ | ⋮ | ⋮ | ⋮ |

A: MAX_WINDGUST
B: MAX_CUMULATIVE_PRECIP
C: MAX_CUMULATIVE_ICE
D: MAX_WINDGUST_FREQ_TH90
E: MAX_WINDGUST_FREQ_TH93

F: MAX_SNOW_DENSITY_6
G: MAX_SNOW_DENSITY_12
H: OUTAGE
I: INFRASTRUCTURE

*FIG. 5A*

| REGION ID | DATETIME | A | B | C | D | E | F | G | H | I |
|---|---|---|---|---|---|---|---|---|---|---|
| 2 | 12/1/2019 0:00 | 23.488598 | 30.093 | 1.631779761 | 9 | 8 | 332.5007557 | 332.5007557 | 1 | 140742 |
| 2 | 12/1/2019 1:00 | 23.488598 | 30.093 | 1.631779761 | 9 | 8 | 332.5007557 | 332.5007557 | 1 | 140742 |
| 2 | 12/1/2019 2:00 | 23.488598 | 30.093 | 1.631779761 | 9 | 8 | 332.5007557 | 332.5007557 | 1 | 140742 |
| 2 | 12/1/2019 3:00 | 23.488598 | 29.761 | 1.504310131 | 9 | 8 | 332.5007557 | 332.5007557 | 1 | 140742 |
| 2 | 12/1/2019 4:00 | 23.488598 | 29.753 | 1.472533928 | 8 | 8 | 332.5007557 | 332.5007557 | 1 | 140742 |
| 2 | 12/1/2019 5:00 | 23.488598 | 29.753 | 1.472533928 | 7 | 7 | 332.5007557 | 332.5007557 | 1 | 140742 |
| 2 | 12/1/2019 6:00 | 23.488598 | 29.714 | 1.435179102 | 6 | 6 | 332.5007557 | 332.5007557 | 1 | 140742 |
| 2 | 12/1/2019 7:00 | 23.488598 | 29.500 | 1.342030453 | 5 | 5 | 332.5007557 | 332.5007557 | 1 | 140742 |
| 2 | 12/1/2019 8:00 | 23.488598 | 28.779 | 1.132470342 | 4 | 4 | 332.5007557 | 332.5007557 | 1 | 140742 |
| 2 | 12/1/2019 9:00 | 23.488598 | 28.160 | 0.723461367 | 3 | 3 | 332.5007557 | 332.5007557 | 1 | 140742 |
| ⋮ | ⋮ | ⋮ | ⋮ | ⋮ | ⋮ | ⋮ | ⋮ | ⋮ | ⋮ | ⋮ |
| 2 | 12/2/2019 0:00 | 12.026546 | 0.246 | 0 | 0 | 0 | 0 | 0 | 0 | 140742 |
| 2 | 12/2/2019 1:00 | 12.026546 | 0.244 | 0 | 0 | 0 | 0 | 0 | 0 | 140742 |
| 2 | 12/2/2019 2:00 | 12.026546 | 0.243 | 0 | 0 | 0 | 0 | 0 | 0 | 140742 |
| 2 | 12/2/2019 3:00 | 12.026546 | 0.243 | 0 | 0 | 0 | 0 | 0 | 0 | 140742 |
| 2 | 12/2/2019 4:00 | 12.026546 | 0.243 | 0 | 0 | 0 | 0 | 0 | 0 | 140742 |
| 2 | 12/2/2019 5:00 | 12.026546 | 0.243 | 0 | 0 | 0 | 0 | 0 | 0 | 140742 |
| 2 | 12/2/2019 6:00 | 12.026546 | 0.243 | 0 | 0 | 0 | 0 | 0 | 0 | 140742 |
| ⋮ | ⋮ | ⋮ | ⋮ | ⋮ | ⋮ | ⋮ | ⋮ | ⋮ | ⋮ | ⋮ |

A: MAX_WINDGUST
B: MAX_CUMULATIVE_PRECIP
C: MAX_CUMULATIVE_ICE
D: MAX_WINDGUST_FREQ_TH90
E: MAX_WINDGUST_FREQ_TH93
F: MAX_SNOW_DENSITY_6
G: MAX_SNOW_DENSITY_12
H: OUTAGE
I: INFRASTRUCTURE

*FIG. 5B*

| REGION ID | 1 | 2 | 3 | 4 | 5 | 6 | 7 | 8 | 9 | 10 | GROUPING 1 | GROUPING 2 |
|---|---|---|---|---|---|---|---|---|---|---|---|---|
| 1 | 0 | | | | | | | | | | A | A |
| 2 | 0.19 | 0 | | | | | | | | | A | A |
| 3 | 0.10 | 0.18 | 0 | | | | | | | | A | A |
| 4 | 0.05 | 0.02 | 0.16 | 0 | | | | | | | A | A |
| 5 | 0.08 | 0.08 | 0.12 | 0.12 | 0 | | | | | | A | B |
| 6 | 0.66 | 0.24 | 0.40 | 0.04 | 0.11 | 0 | | | | | A | B |
| 7 | 0.90 | 0.28 | 0.20 | 0.07 | 0.08 | 0.13 | 0 | | | | A | C |
| 8 | 030 | 0.22 | 0.30 | 0.90 | 0.80 | 0.50 | 0.02 | 0 | | | B | C |
| 9 | 0.40 | 0.30 | 0.65 | 0.45 | 0.61 | 0.60 | 0.01 | 0.13 | 0 | | B | C |
| 10 | 0.57 | 0.33 | 0.35 | 0.67 | 0.70 | 0.70 | 0.19 | 0.14 | 0.12 | 0 | B | C |

*FIG. 6*

| EX. | GROUPING | J | K | THRESHOLD 1 | THRESHOLD 2 | MAPE | FALSE ALARM RATE |
|---|---|---|---|---|---|---|---|
| 1 | 1 | 2 | 0 | WINDGUST_FREQ_90TH | MAX_SNOW_DENSITY_6 | 0.7 | 0.2 |
| 2 | 1 | 2 | 0 | WINDGUST_FREQ_90TH | MAX_SNOW_DENSITY_12 | 0.69 | 0.19 |
| 3 | 1 | 2 | 0 | WINDGUST_FREQ_93TH | MAX_SNOW_DENSITY_6 | 0.68 | 0.18 |
| 4 | 1 | 2 | 0 | WINDGUST_FREQ_93TH | MAX_SNOW_DENSITY_12 | 0.67 | 0.17 |
| 5 | 1 | 2 | 0.1 | WINDGUST_FREQ_90TH | MAX_SNOW_DENSITY_6 | 0.66 | 0.16 |
| 6 | 1 | 2 | 0.1 | WINDGUST_FREQ_90TH | MAX_SNOW_DENSITY_12 | 0.65 | 0.15 |
| 7 | 1 | 2 | 0.1 | WINDGUST_FREQ_93TH | MAX_SNOW_DENSITY_6 | 0.64 | 0.14 |
| 8 | 1 | 2 | 0.1 | WINDGUST_FREQ_93TH | MAX_SNOW_DENSITY_12 | 0.63 | 0.13 |
| 9 | 1 | 3 | 0 | WINDGUST_FREQ_90TH | MAX_SNOW_DENSITY_6 | 0.62 | 0.12 |
| 10 | 1 | 3 | 0 | WINDGUST_FREQ_90TH | MAX_SNOW_DENSITY_12 | 0.61 | 0.11 |
| ... | ... | ... | ... | ... | ... | ... | ... |
| 25 | 2 | 3 | 0 | WINDGUST_FREQ_90TH | MAX_SNOW_DENSITY_6 | 0.67 | 0.16 |
| 26 | 2 | 3 | 0 | WINDGUST_FREQ_90TH | MAX_SNOW_DENSITY_12 | 0.66 | 0.15 |
| 27 | 2 | 3 | 0 | WINDGUST_FREQ_93TH | MAX_SNOW_DENSITY_6 | 0.65 | 0.14 |
| 28 | 2 | 3 | 0 | WINDGUST_FREQ_93TH | MAX_SNOW_DENSITY_12 | 0.64 | 0.13 |
| 29 | 2 | 3 | 0.1 | WINDGUST_FREQ_90TH | MAX_SNOW_DENSITY_6 | 0.63 | 0.12 |
| 30 | 2 | 3 | 0.1 | WINDGUST_FREQ_90TH | MAX_SNOW_DENSITY_12 | 0.62 | 0.11 |
| 31 | 2 | 3 | 0.1 | WINDGUST_FREQ_93TH | MAX_SNOW_DENSITY_6 | 0.61 | 0.10 |
| 32 | 2 | 3 | 0.1 | WINDGUST_FREQ_93TH | MAX_SNOW_DENSITY_12 | 0.60 | 0.09 |

J: MIN SAMPLE LEAF
K: SAMPLE WEIGHT FACTOR

*FIG. 7*

AUTOMATED ARTIFICIAL INTELLIGENCE MODEL GENERATION, TRAINING, AND TESTING

BACKGROUND

The present application relates generally to an improved data processing apparatus and method and more specifically to mechanisms for automatically generating, training, and testing artificial intelligence models, such as weather-based artificial intelligence models.

Artificial intelligence (AI) increasingly utilizes machine learning computer models to model various real-world mechanisms, such as biological mechanisms, physics based mechanisms, business and commercial mechanisms, and the like, typically for classification and/or predictive purposes. Such machine learning (ML) computer models include linear regression models, logistic regression, linear discriminant analysis, decision trees, naïve Bayes, K-nearest neighbors, learning vector quantization, support vector machines, random forest, and deep neural networks. While ML computer models provide a good tool for performing such classification and/or predictive operations, the process of generating, training, and testing such ML computer models is a very time consuming and resource consuming intensive process often requiring a large amount of manual effort requiring a lot of experimentation.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for automatically generating a machine learning (ML) computer model. The method comprises automatically generating a plurality of aggregated dataset groups. Each aggregated dataset group comprises one or more original datasets, of a plurality of original datasets, grouped together based on a calculation of a degree of correlation between characteristics associated with each of the original datasets in the plurality of original datasets to generate an aggregated dataset. The method further comprises automatically generating, for each aggregated dataset group, a plurality of ML computer model instances. Each ML computer model instance is generated by configuring a ML computer model with a different combination of thresholds and hyperparameters than other ML computer model instances in the plurality of ML computer model instances. The method also comprises executing the plurality of ML computer model instances, for each aggregated dataset group, to generate performance metric information for each ML computer model instance. Moreover, the method comprises evaluating the performance metric information for each ML computer model instance to select a set of ML computer model instances from the plurality of ML computer model instances for the aggregated dataset such that each aggregated dataset has an associated set of ML computer model instances. In addition, the method comprises selecting one or more ML computer model instances from across all of the sets of ML computer model instances as a candidate for deployment to a decision support computing system.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 3 is a flowchart outlining an example operation for grouping training datasets into aggregate training datasets in accordance with one illustrative embodiment;

FIGS. 5A and 5B are example portions of input datasets for two example regions in accordance with one illustrative embodiment;

FIG. 6 is an example diagram illustrating groupings of regions into region groups in accordance with one illustrative embodiment;

FIG. 7 is an example diagram illustrating ML computer model instance experiments and corresponding performance metrics in accordance with one illustrative embodiment;

DETAILED DESCRIPTION

Figure 1:
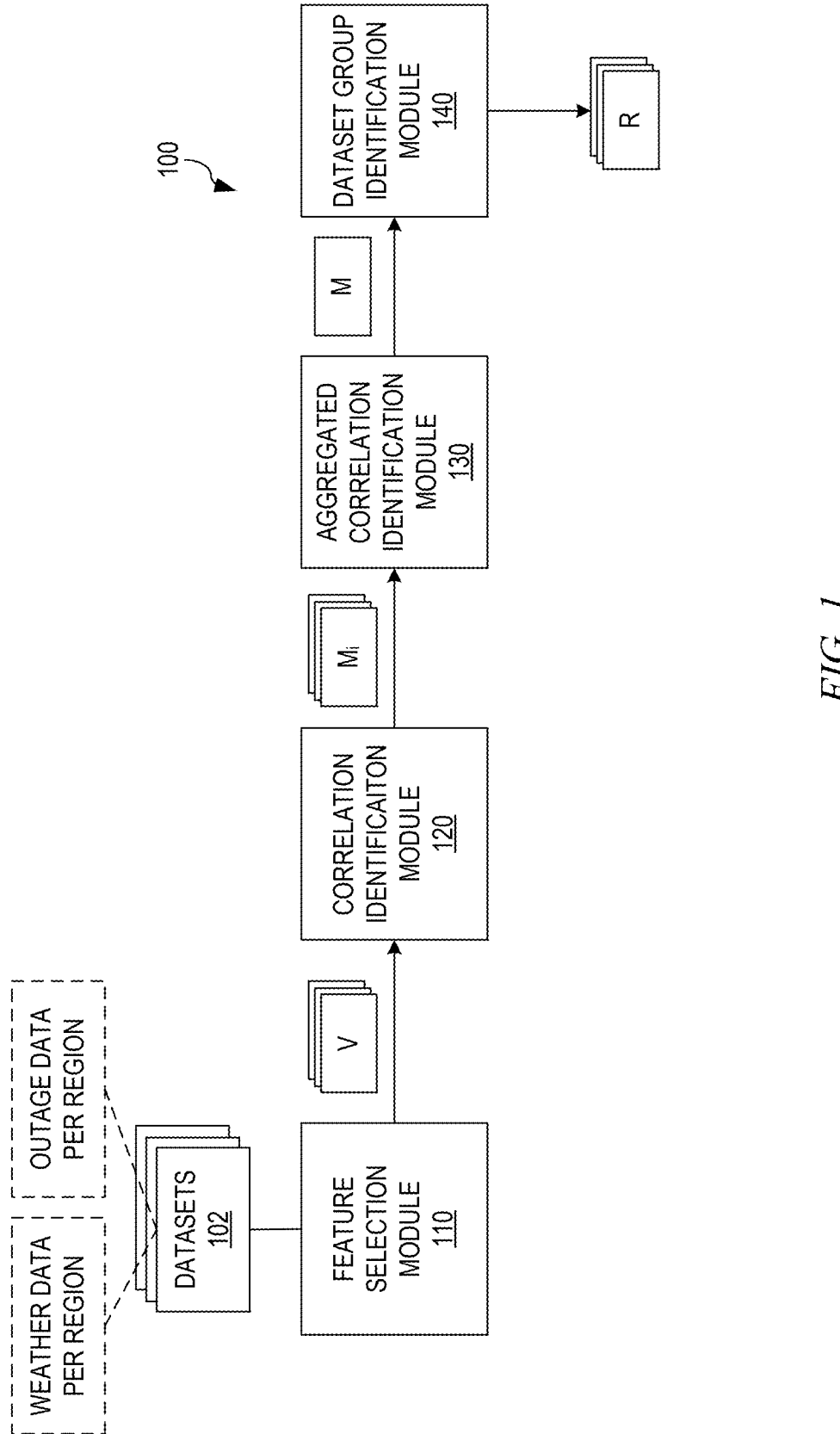
FIG. 1 is an example block diagram illustrating the primary operational engines or modules and a process to grouping datasets in accordance with one illustrative embodiment.

While artificial intelligence (AI), and machine learning (ML) computer models used to implement AI solutions, provide useful advances to solving complex problems and modeling real-world mechanisms and processes, the generation, training, and testing of such ML computer models such that ML computer models that consistently generate accurate results is a very labor, time, and resource intensive process that often requires a large amount of experimentation. This labor, time, and resource cost is even greater when the mechanisms and processes that the AI and ML computer model tools are used to model are largely variable and not as predictable. One area where such variability and unpredictability is large is in weather computer models.

For ML computer model generation, training, and testing, in the weather-based prediction area, various input data characteristics are observed. For example, in weather based ML computer models, the ML computer models will derive a number of input features from raw weather variables using different aggregation operations. Some variables also have cumulative aggregation, like snow and ice totals. In addition, the ML computer models also implement threshold values, which are derived values that that are used to generate additional variables, based on historical data and/or subject matter expert (SME) knowledge, e.g., snow threshold, max wind guest, wind speed, etc. For example, in the context of wind speed, derived input features taken from raw wind data values may include max_wind_speed, min_wind_speed, avg_wind_speed, max_wind_speed_frequency_th95 (which indicates the number of times in a given time range that the wind speed was above a threshold value), etc. From this wind speed example, it may be necessary to generate many different versions of max_wind_speed_frequency_thXX where XX can be any percentile (90,95, 99, etc.). In the end only one of these may be selected for the final ML computer model, e.g., the ML computer model may not implement both max_wind_speed_frequency_th95 and max_wind_speed_frequency_th99.

Moreover, target data from some weather-related conditions can be very sparse, which requires balancing data sets and the derivation of additional thresholds. For example, in predicting power outages, for the majority of the days in a year there are no, or very few, power outages from non-weather related causes. There are only a handful of instances in a given year where there is weather-caused power outage, and within those instances, very few specific types of weather (snowstorm, windstorm, thunderstorm, hurricane, etc.) that tend to cause power outages. Thus, a particular day can be part of a weather-caused power outage event or not. When a day is not part of a weather event, this is referred to a routine day. To build a ML computer model, such as a classifier, that will predict a weather event day or a routine day, the training data set includes weather features and the historic information on whether the day was a routine or weather event day for each region. Since the historic data includes several years of data, it is not possible to manually mark each day as a routine or weather-event day. Instead, the number of power outages on a specific day is used to identify if that day was a weather event day. If the number of daily outages exceeds a threshold value (OutageThreshold), it is mark as a weather event day. This OutageThreshold is computed using the distribution of power outages over the historic time period for that region. Typically, the OutageThreshold value is a very small value (e.g., <5) for most regions. Very rarely, values up to 10 may be seen, and this is when the region size is very large.

Because these derived features, thresholds, and balancing or data sets may be quite variable, finding accurate weather-based prediction ML computer models requires generating, training, and testing a large number of ML computer models for different combinations of these features and thresholds before a final set of ML computer models having a final set of features and thresholds can be selected that provide a satisfactory level of accuracy. This results in a large set of ML computer models that need to be generated, trained, and tested, and a large amount of experimentation requiring a large expenditure of time, resources, and human effort, as this process is largely a manual process. Even so, such manual processes, due to limitations in human effort, i.e., there are a limited number of waking hours in a day, there are limits on financial support, there are limitations on access to computing resources, etc., such manual efforts for generating, training, and testing are often constrained and result in the manual experimentation being not exhaustive of all the possibilities for achieving an accurate AI solution and ML computer model configuration.

In addition to the problems associated with manual experimentation to generating ML computer models and AI solutions, there are other limitations in the accepted methodology for ML computer model training and testing. For example, accepted methodologies for ML computer model training and testing utilizes cross-validation approaches for model validation to evaluate how the results of the model will generalize to an independent data set. Cross validation tests the model's ability to predict new data that was not used in training in order to identify problems such as overfitting or bias, with such cross validation involving many rounds of executing the computer model on a training data set and validating results on a validation or testing data set. Such cross validation approaches to ML computer model training only look at hyperparameter, and feature selection and engineering, and do not handle thresholding of individual features. For example, once threshold values are identified, features are generated, e.g., features for windspeed_frequency_thXX for different values of XX, are generated, as mentioned previously, where the XX here can be $90^{th}$, $93^{rd}$, $95^{th}$, $97^{th}$, $99^{th}$ percentile of windspeed over the historic distribution. Each of these percentile values, e.g., $90^{th}$ percentile of daily windspeed over historic data, is the threshold, e.g., the windspeedThreshold90. A feature is the windspeed_frequency_th90 for a particular day, defined as the number of times the windspeed exceeded windspeedThreshold90. The threshold variable is not part of the training data set, but used to derive features in the training data set. Sometimes, threshold values can also be used to derive the target variable of the training data set, e.g., the earlier example of OutageThreshold is used to derive the target variable "is weather_event" which has a Boolean value.

The illustrative embodiments provide an improved computing tool and improved computing tool process that operates to automate ML computer model generation, training, testing, and final model selection while taking into account thresholding of individual features of the ML computer models and sparsity of input datasets. The illustrative embodiments provide mechanisms for automatically grouping datasets together to generate new input datasets to address the sparsity of input datasets issue. The illustrative embodiments also provide mechanisms to automatically generate ML computer model instances for various combinations of input features, thresholds, and hyperparameters, automatically train, test, and evaluate these automatically generated ML computer model instances, and perform selection of a set of one or more of the best performing ML computer model instances as final ML computer model instances for consideration by subject matter experts (SMEs) in modeling a particular mechanism or process.

It should be appreciated that while the following description will use weather-based ML computer models, and specifically weather-based ML computer models for predicting power outage events, as an illustrative example, due to their use of thresholds and the fact that this subject matter area tends to have instances of sparse datasets, the illustrative embodiments are not limited to such. Rather, the illustrative embodiments of the present invention may be applicable to any ML computer model AI solution in which such thresholding and sparsity of input datasets is observed. For example, other subject matter areas in which the mechanisms of the illustrative embodiments may be implemented to automatically generate, train, test, and select a set of ML computer models may include, but is not limited to, demographics of particular regions, e.g., determining if a region is predominantly a particular demographic or not, a threshold value may be defined that helps identify when the region is predominantly that demographic or not. If the portion of the population of the region having a particular demographic characteristic, or set of demographic characteristics, is X % of total population, it can be declared that the region is biased towards that demographic/set of demographics. The value X is the threshold, where X could be any suitable value, e.g., 50, 60, 80, etc. For example, this determination may be used to understand if there are particular demographic biases in the power outage prediction solution. This is just one example of another subject matter area where automated ML computer model generation, training, and testing can be implemented. The mechanisms of the illustrative embodiments may be implemented with regard to any context where the features used in the training data set have some uncertainties and it is desirable to explore various possibilities of these features.

The illustrative embodiments improve ML computer model (or simply "model") training/re-training, model evaluation, and model deployment at least by providing an improved computing tool and improved computing tool process that focuses on scaling experimentation with multiple automated model-training-testing runs. With the mechanisms of the illustrative embodiments, in order to address sparsity of data issues, the illustrative embodiments include a dataset grouping component that takes separate datasets, determines correlations between the datasets, and groups datasets according to their correlations and optimizes the groupings for the particular predictive or classification purposes of the ML computer model. In addition, the experiments, or ML computer model instances, that operate on the grouped datasets may be automatically generated and executed on the grouped datasets and evaluated for selection of the best performing experiments/MVL computer models for recommendation.

Each experiment, or ML computer model instance, may be defined with a combination of values of threshold parameters, e.g., weather specific threshold parameters such as max, min, average snowfall, number of power outages, maximum daily wind gust, etc. in the case of a weather-based ML computer model, hyperparameters, and groupings of training datasets, leading to a large number of different ML computer model instances with many points of variability between the ML computer model instances. Thus, a larger amount of experimentation and evaluation of potential combinations of threshold parameters, hyperparameters, and training datasets is achieved than other scaling solutions which only focus on hyperparameters of a ML computer model.

As noted above, one point of variability in the ML computer model instances is the variability in threshold parameters used to derive additional features for training the ML computer model instances. These threshold parameters differ from hypermeters and other model parameters that are specific to the particular chosen ML technique, e.g., linear regression, random forest, etc., and which govern the training process. For example, hyperparameters define parameters of the machine learning algorithm employed, e.g., for a Random Forest Regressor, an example hyperparameter may be the minimum sample leaf parameter. To the contrary, the thresholds are derived variables that are not tied to the particular ML technique or ML computer model selected, but are derived from the raw input datasets themselves. The thresholds are automatically defined using various types of thresholds based analysis, such as statistical analysis identifying historic trends in input features, such as weather features in a weather based power outage prediction model, of datasets on which the threshold is applied to get additional features for training the ML computer model. These thresholds may be static values, e.g., windgust value of 22 meters/sec, or dynamically determined values, e.g., exceeds the $90^{th}$ percentile of windgust across the historic windgust data. These thresholds may be used to derive other data that may be provided as input features for the training of the ML computer model, e.g., a windgust threshold may be used to derive a windgust frequency.

For example, if a windgust threshold is the 90th percentile of windgust values across the historic windgust data, the frequency variable for a region is essentially the number of times the windgust variable for that region exceeds this threshold. In this example, this frequency variable is referred to as "windgust_freq_90th". This, when a training dataset is generated, multiple windgust frequency variables may be generated based on windgust thresholds, e.g., windgust_freq_90th, windgust_freq_93rd, windgust_freq_95th, and windgust_freq_97th. When generating ML computer model instances, there will be different ML computer model instances, or experiments, for each of the above frequencies, in addition to other threshold based variations in features, hyperparameters and training dataset groupings.

Thus, the points of variability in the generated ML computer model instances, or experiments, are much more than just changes in hyperparameters. Current approaches to scaling ML computer model training only address hyperparameter variability and thus, there is a fixed set of experiments for each ML algorithm no matter what the use case, which does not adequately address all use cases, especially those that are highly variable, such as weather based prediction models. The illustrative embodiments not only look to variability in hyperparameters, but also provide automated improved computing tool mechanisms and processes to consider threshold variability and variability in the training datasets to address sparsity of data, thereby providing an improved mechanism for scaling experimentation and identification of optimum ML computer model configurations for a desired implementation of the ML computer model.

Having generate ML computer model instances based on various combinations of threshold parameters, hyperparameters, and the grouping of datasets as will be discussed in more detail hereafter, the ML computer model instances are then executed on the group of datasets to generate predictions/classifications. The performance of the ML computer model instances is then evaluated by generating various evaluation metrics, e.g., mean absolute percentage error, false alarm rate, hit rate, root mean square error, etc., thereby evaluating each ML computer model instance's predictions/classifications against actual or ground truth data. Those ML computer model instances that do not meet predetermined levels of performance, based on specified performance tradeoff criteria, are eliminated from further consideration. This process is performed for each grouping of datasets such that a set of ML computer model instances meeting predetermined levels of performance are generated for each grouping. Thereafter, a best model selection process may be performed across groupings of datasets based on performance selection criteria to thereby select a set of one or more final ML computer model instances. A visual representation of the benefits and limitations of each of the ML computer model instances in the one or more final ML computer model instances may be generated and presented to a subject matter expert (SME) for selection of a ML computer model instance, e.g., an instance of a combination of features, thresholds, and hyperparameters, for configuring an ML computer model that may be executed on new datasets to generate predictions/classifications for an intended purpose. Thus, the optimum configuration of an ML computer model may be automatically determined through large-scale automated experimentation.

With the mechanisms of the illustrative embodiments, an automated improved computing tool and improved computing tool process are provided that enables automatic experimentation with a wide range of threshold values, and combinations of threshold values and hyperparameters, for each feature of a ML computer model. Moreover, the illustrative embodiments address sparsity of dataset issues through mechanisms that automatically group datasets according to their correspondence, as discussed in greater detail hereafter. Thus, the illustrative embodiments are able to scale experimentation with a large set of differently configured ML computer model instances and determine one or more best performing, or optimum, ML computer model configuration for modeling a mechanism or process of interest, e.g., weather-based power outage ML computer modeling.

Before beginning the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine" or "module" if used herein with regard to describing embodiments and features of the invention, is not intended to be limiting of any particular implementation for accomplishing and/or performing the actions, steps, processes, etc., attributable to and/or performed by the engine. An engine or module may be, but is not limited to, software executing on computer hardware, specialized computer hardware and/or firmware, or any combination thereof that performs the specified functions including, but not limited to, any use of a general and/or specialized processor in combination with appropriate software loaded or stored in a machine readable memory and executed by the processor to thereby specifically configure the processor to perform the specific functions of the illustrative embodiments. Further, any name associated with a particular engine or module is, unless otherwise specified, for purposes of convenience of reference and not intended to be limiting to a specific implementation. Additionally, any functionality attributed to an engine or module may be equally performed by multiple engines or modules, incorporated into and/or combined with the functionality of another engine or module of the same or different type, or distributed across one or more engines or modules of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, one of the mechanisms provided in the improved computing tool and improved computing tool process of the illustrative embodiments, is a dataset grouping mechanism that addresses sparsity of dataset issues. FIG. 1 is an example block diagram illustrating the primary operational engines or modules and a process to grouping datasets in accordance with one illustrative embodiment. As noted above, as an example, the illustrative embodiments are described in the context of a weather-based ML computer model for predicting power outage events and thus, the grouping of datasets is described with regard to FIG. 1 as being performed across geographic regions, where each geographic region (or simply "region") has its own corresponding dataset. The process shown in FIG. 1 groups data across regions to derive multiple region groupings. The process starts with weather features for each region and identifies, for each region, the correlations of that region with other regions to define a set of possible region groupings.

As shown in FIG. 1, the dataset grouping engine 100 comprises a feature selection module 110, a correlation identification module 120, an aggregated correlation identification module 130, and a dataset group identification module 140. The dataset grouping engine 100 groups datasets 102 according to their determined correlations as will be described hereafter. The raw input datasets 102 comprise a plurality of data values from which features may be selected for input to ML computer models. For example, in the case of weather-based ML computer models for predicting power outages, the datasets 102 used for training the ML computer models may include daily power outage data for each geographic region for which power outage predictions are to be performed, e.g., substation, feeder, etc. The training datasets 102 may further include daily weather variables, e.g., precipitation, ice, snow, wind gust, windspeed, temperature, soil moisture, etc. per region. Furthermore, the training datasets 102 may include region specific data describing characteristics of the region important to modeling weather based power outages, or other characteristics for other intended predictions/classifications, e.g., number of electrical poles and length of power lines in the corresponding region, number of homes/business in the region, or other characteristics of the regional power grid, geography, or the like, that may provide insights into weather-based power outage events.

In the context of weather based power outage predictions, as the running example in the present description, observations indicate that power outage values for a region will typically be zero or close to zero on most days of the year, i.e., it is assumed that the power grid is designed to provide sufficient power to power consumers for normal usage and that power outages due to weather are a rarity, i.e., storm level outages are rare. As a result, such power outage data is rather sparse for various regions, making the data difficult for use in training weather based power outage predicting ML computer models as there is not a sufficient amount of data for a given region to provide accurate training and results.

Hence, grouping of datasets for different regions would help with the data sparsity issue, but it is important to know how to group these regions and thereby increase the volume of training data available. The illustrative embodiments group data from multiple regions to derive region groups and then build ML computer models for each region group, but generate predictions for individual regions within the region group using the models. Such grouping of regions into different region groups is a difficult process, with the difficulty increasing with the increase in the number of regions being considered. For example, in the ongoing example of a power outage prediction ML computer model operating on region data, when a region is a utility corridor (or feeder), there can 1000s of feeders in a utility company's territory. The reason this would be difficult to do manually is that this is dependent on multiple factors: Common causes of outages across the regions, similar terrain, similar weather for those regions, proximity, etc. All of these factors have to be considered together to generate the groupings. Thus, as the number of different regions and corresponding datasets increases, more potential groupings of regions must be considered and evaluated to determine which regions should be grouped, and such a process becomes impractical to perform outside of computing solutions.

The illustrative embodiments provide an improved computing tool and corresponding process that groups regions into multi-region groupings based on a determined correlation between the regions. As shown in FIG. 1, the feature selection module 110 receives input datasets 102 for a plurality of regions, where each of these input datasets 102 comprise, for the corresponding region, historic weather data for the region, historic power outage data for the region, and specific region data, . The input datasets 102 may be considered training datasets for training corresponding ML computer models for the region. The feature selection module 110 selects a set of features based on the input datasets

102 and configuration of the ML computer models that are to be trained based on the input datasets 102. That is, configuration information may specify what features are of interest for input to the ML computer models to use as input upon which predictions/classifications are to be determined by the ML computer models. These features may include raw data from the datasets 102 and/or may include derived values derived from the raw data of the datasets 102. In machine learning and pattern recognition, a "feature" is an individual measurable property or characteristic.

The feature selection module 110 comprises logic and functionality that is configured to select informative, discriminating, and independent features from the raw data of the input datasets 102. In the context of a weather based power outage prediction ML computer model implementation, these selected features may include selected weather features and outage features for the corresponding region extracted or selected from the corresponding input dataset 102 for the corresponding region. The initial set of features to be selected may be defined using subject matter expert (SME) experience with the feature selection module 110 implementing the SME specification to extract the features from the raw input data. Examples of the raw data, for a weather based power outage prediction ML computer model, may include precipitation (rain) data, snowfall data, ice accumulation data, wind speed data, wind gust data, temperature data, power system infrastructure data, e.g., numbers of power lines and numbers of power poles, as well as power outage counts. Examples of the extracted features may include max_cumulative_precip, avg_ice, max_snow, avg_temp, max_wind_gust, max_wind, etc. These selected features result in a selected set of input variables V for a ML computer model, e.g., the weather based power outage prediction ML computer model, generated by the feature selection module 110 and output by the feature selection module 110 to the correlation identification module 120. Thus, for example, there may be x number of entries in the listing of variables V and m number of regions. Thus, for example, a simplified listing of V may be <maximum wind gust, maximum windspeed, ice accretion, precipitation, wind gust duration, number of outages>such that x=6 and there is a V for each region.

The correlation identification module 120 comprises logic and functionality that operates to generate a pair-wise correlation measurement, per selected feature $v_i$ in V, between each pair of regions $s_i$, $s_j$ in S, where i is an integer value from 1 to m−1 and j is an integer value from 2 to m. Different correlation techniques may be used for generating pair-wise correlation measurements, such as linear correlation or time-series correlation techniques. The result of the correlation measurements generated by the correlation identification module 120 is a m×m matrix $M_i$ per feature entry $v_i$ in the listing of features V. The matrix $M_i$ has an entry for each correlation coefficient value between regions for $v_i$. A single m×m matrix may then be generated by the aggregated correlation identification module 130 by aggregating the correlation coefficient values across matrices $M_i$, i.e., the aggregated correlation coefficients between $s_i$, $s_j$ for each $v_i$ in V. The aggregation may take various forms including averaging of the correlation coefficient values across the matrices $M_i$. This aggregation may be a regular average, or in some illustrative embodiments may be a weighted average. In the case of a weighted average, the weights used in the weighted average may be based on experience and historical weather. For example, a higher weight may be given to wind gust than precipitation if it is known that high wind gusts contribute more significantly to power outages than high precipitation in the region(s).

The resulting single matrix M is output by the aggregated correlation identification module 130 to the dataset group identification module 140. The resulting single matrix M identifies, for each pair of regions $s_i$, $s_j$, an aggregated correlation measurement between these regions across all features $v_i$ in V. The dataset group identification module 140 takes this single matrix M and performs grouping of regions based on these aggregated correlation measurements. The dataset group identification module 140 comprises logic and functionality that operates to optimize the number of region groups so as to maximum a number of region groups and ensure that each region group has a minimum volume of data. For example, the minimum volume of data may be measured by a particular amount of data of a particular type, e.g., a predetermined minimum number of weather events (e.g., power outages) in the combined datasets 102. An optimal grouping is where there are as many groups as possible that still maintain a minimum number of weather events. Thus, if region A is associated with dataset 1, region B is associated with dataset 2, and region C is associated with dataset 3, region A and region B may be grouped together, and region C may be its own grouping, if each of these groupings still have a minimum number of weather events (e.g., power outages due to weather). It should be appreciated that in performing the grouping of regions, a group may comprise one or more regions and thus, a group could be a single region and single dataset if the situation warrants such.

In general, each region will only belong to one group. To generate the groupings, a clustering operation may be performed on aggregated correlation metric values, e.g., aggregated distance metrics. The term distance metrics are a type of correlation metrics and may include, for example, a geographic distance as once of the distance metrics. There can be many different distance metrics that could be aggregated together to determine the final optimal grouping. However, the correlation metrics may include other types of correlation characteristics that are not limited to distance metrics, but may include other types of characteristics including any similarity of characteristics data specifying characteristics of a region and its similarity with characteristics of other regions.

Thus, in some illustrative embodiments, the correlation identification module 120 uses a distance matrix calculation where the distance matrix is calculated based on a reverse correlation or other time series distance measure, such as a matrix profile distance. The aggregated correlation identification module 130 aggregates all the computed distance matrices, based on various features, together, and then the dataset group identification module 140 clusters the aggregated distance matrix M from 130 to generate groupings according to the cluster labels. The clustering operations may include affinity propagation, agglomerative clustering, or any other suitable known or later developed clustering technology.

The resulting set of region groups R may then be output by the dataset group identification engine 140 for use in defining region group datasets corresponds to the set of region groups R. That is, for a region group r in the set of region groups R, a corresponding dataset is generated as the combination of datasets for each of the regions in the region group r. The resulting set of region groupings R generated and output by the dataset grouping engine 100, and their corresponding aggregated training datasets D aggregated from the individual datasets for each of the regions that are part of the corresponding group, are further used as a basis for generating, training, testing, and evaluating ML computer model instances for corresponding region groups. Moreover, based on the generating, training, testing, and evaluation of these ML computer model instances for each separate region group, a cross-region group selection process may be performed to select one or more ML computer model instances to be included in a final set of ML computer model instances for recommendation and reporting to a subject matter expert (SME) for consideration in performing the desired ML computer model operation, e.g., weather-based power outage prediction operations in the running example.

Figure 2:
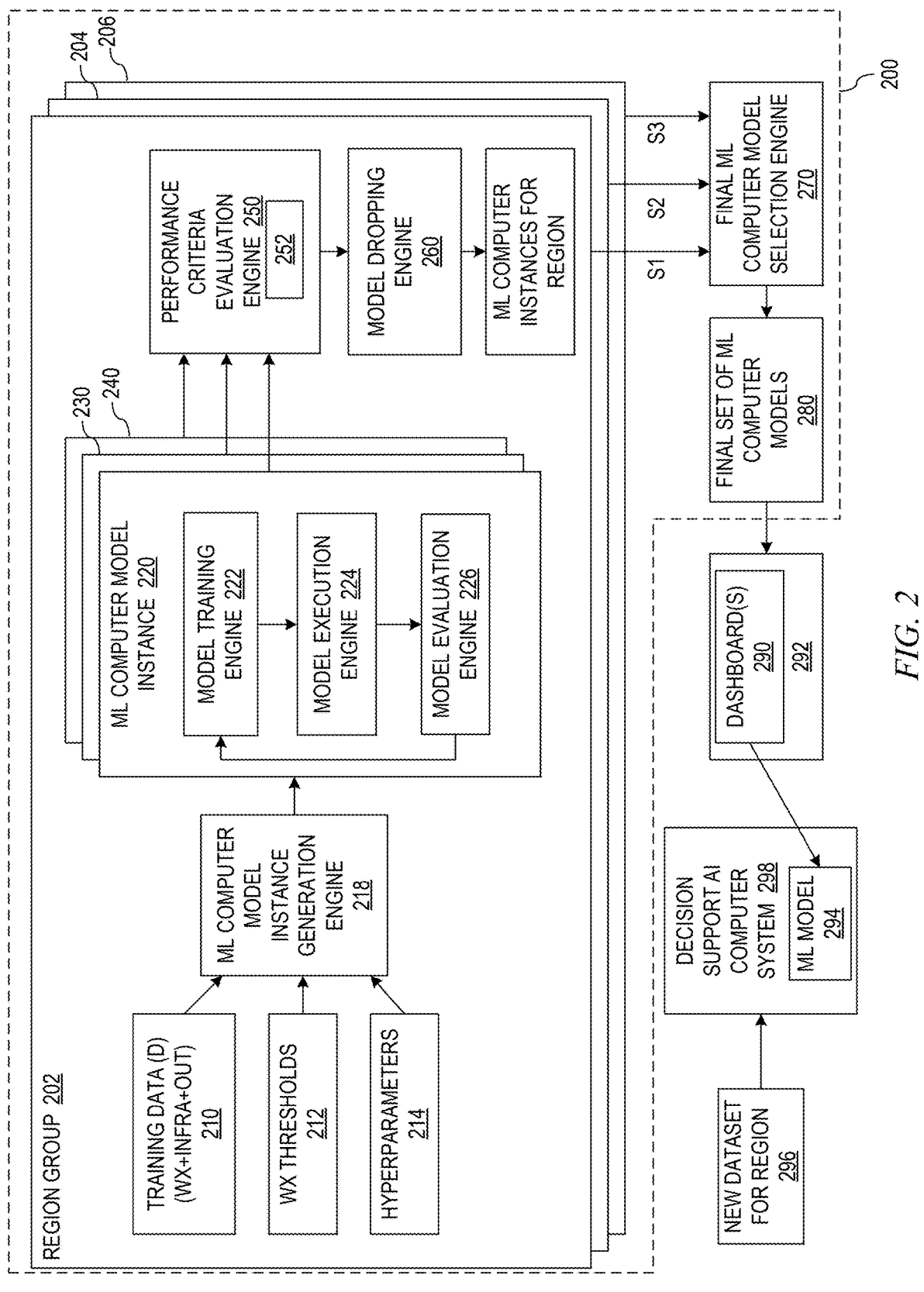
FIG. 2 is an example block diagram of the primary operational components of a ML computer model selection engine for a region group in accordance with one illustrative embodiment.

FIG. 2 is an example block diagram of the primary operational components of a ML computer model selection engine 200 for a region group in accordance with one illustrative embodiment. It should be appreciated that the components shown in FIG. 2 for a single region group may be implemented for multiple different region groups 202-206 with the final ML computer model selection engine 270 being implemented across multiple region groups 202-206 to select a final set of one or more ML computer models 280 for recommendation and presentation of performance information to a SME user via one or more ML computer model evaluation dashboards 290 and a corresponding client computing device 292 via which these dashboards are presented. The dashboard output may provide user selection mechanisms through which the SME user may select one or more of the ML computer models 294 in the final set 280 for further implementation in performing the desired AI operation, such as weather based power outage predictions, for a given new dataset 296 for a region of interest. The selected one or more ML computer models 294 may be deployed to a decision support AI computer system 298 which performs the AI operations based on the predictions/classifications generated by the ML computer model(s) 294 processing the new dataset 296.

Once region groupings R and their corresponding aggregated training datasets D are generated by the mechanisms of the illustrative embodiments, such as in the manner described previously with regard to FIG. 1, a set of ML computer model training experiments are generated by generating a set of ML computer model instances and corresponding training logic instances for training and evaluating the performance of the corresponding ML computer model instances. As shown in FIG. 2, there is a separate set of ML computer model instances and corresponding training and evaluation logic for each region group in R, e.g., region groupings 202-204. In addition, there is a separate set of training data 210, thresholds 212, and hyperparameters 214 for each region group in R, although in some embodiments the thresholds 212 and hyperparameters 214 may be common across each of the region groups in R with differing training datasets D 210 for each of the different region groups in R.

In some illustrative embodiments, each of the individual ML computer model instances along with their training and evaluation logic may be implemented as Docker images or other operating system virtualization based data structures. In the case of Docker images, the Docker images for the ML computer model instances may be executed within a Docker container corresponding to the region group 202-206. The Docker container in this case would include the logic for implementing performance criteria evaluations and for removing ML computer model instances from further consideration, e.g., engines 250 and 260, as well as other supportive logic for executing the docker images for the various ML computer model instances 220-240. In other illustrative embodiments, the docker image may comprise the input data 210, 212, 214, and each of the computing logic and functionalities depicted as elements 220-260 in FIG. 2, such that a separate docker image is generated for each region group. It should be appreciated that the present invention is not limited to implementation with Docker images and containers or operating system virtualization mechanisms and such embodiments are only described as examples due to the ease of deployment and execution of such Docker images, containers, and operating system virtualization mechanisms. To the contrary, the illustrative embodiments may be implemented in any suitable runtime environment with or without such Docker images, containers, or operating system virtualization mechanisms without departing from the spirit and scope of the present invention.

As shown in FIG. 2, the training dataset 210 for the region group 202, thresholds on the training dataset 212, and hyperparameters 214 for the ML computer model instances are provided as input for defining ML computer model instances. The ML computer model generation engine 218 receives these inputs and generates a separate ML computer model instance 220-240 for each of a plurality of combinations of threshold and hyperparameter values, with the training data 210 being common amongst each of the ML computer model instances 220-240. The training data may comprise a combination of raw weather data (wx) for the regions of the region group, infrastructure data for the regions of the region group, power outage data for the regions of the region group, and/or the like. Thus, each separate ML computer model instance 220-240 will be configured with a different combination of threshold values and hyperparameters, but will be trained using the same common training dataset D 210.

In the depicted example, the ML computer model instances 220-240 comprise logic components or engines 222-226 for implementing automatic machine learning training, execution, and evaluation of the corresponding ML computer model instance. It should be appreciated that while FIG. 2 shows each separate ML computer model instance 220-240 having their own set of engines 222-226, the illustrative embodiments are not limited to such. Rather, each ML computer model instance 220-240 may be separate instances of the ML computer model generated by the ML computer model generation engine 218, with a common set of engines 222-226 operating on all of the ML computer model instances 220-240.

The model training engine 222 of a ML computer model instance 220 provides logic and functionality to perform machine learning functions according to a desired machine learning algorithm. As part of this machine learning, the model training engine 222 configures the operational parameters of the ML computer model instance 220 and processes the performance metrics generated by the model evaluation engine 226 in an iterative manner to train the ML computer model instance 220 until the model training engine 222 determines that the performance of the ML computer model instance 220 has achieved a desired level of performance, a predetermined number of iterations or epochs have occurred, or a predetermined amount of improvement in performance is not achieved with subsequent iterations of the training.

The model execution engine 224 executes the ML computer model instance 220 on the input data 210 to generate predictions/classifications according to the operational parameters, thresholds, and hyperparameters with which the ML computer model instance 220 is configured. These operational parameters may comprise, for example, weights of nodes that are dynamically adjusted based on an evaluation of the performance of the ML computer model instance 220 in accordance with the machine learning algorithm implemented by the model training engine 222. The ML computer model instance 220 executes based on its current configuration and generates predictions/classifications. For example, in a weather based power outage prediction implementation, the ML computer model instance 220 is executed to generate predictions of daily power outages due to weather conditions based on the input dataset (weather features and infrastructure data) 210, for each day in the input dataset 210.

These results are then provided to the model evaluation engine 226 which operates on the results to generate measurements of the performance of the ML computer model instance 220 relative to the desired or known results, e.g., the ground truth. For example, the input dataset includes power outage data for the regions of the region group and this data may be used as a ground truth against which the results of the ML computer model instance 220 may be compared to determine a loss or error in the predictions generated by the ML computer model instance 220 as well as generate various other measures of performance including activation maps indicating the relative contributions of hidden layer nodes in the ML computer model instance 220 to the generated results, or the like. In some illustrative embodiments, the model evaluation engine 226 generates various evaluation metrics including Mean Absolute Percentage Error (MAPE), False Alarm Rate, Hit Rate, Root Mean Square Error, and/or the like.

The model evaluation engine 226, in some illustrative embodiments, may utilize subject matter expert (SME) or client supplied information to evaluate the results generated by the ML computer model instance 220, where this SME or client supplied information provides information about the tradeoffs or balance of considerations that lead to decision making that may influence the data in the training dataset. In other words, this information may provide insights into why the training dataset values are what they are and provide a better understanding for knowing how to evaluate and modify the operational parameters of the ML computer model instance.

For example, if a client is a utility company or governmental organization responsible for regions in the region group, the client's outage ranges for which they mobilize restoration crews differently may be utilized to evaluate the ML computer model instance 220. Mobilization depends on the power outage range (e.g., for 10-100 outages the crew size is much smaller than for >500 outages). That is, a utility company plans mobilization of their crew for operationalizing restoration efforts after a storm based on the number of outages in the region(s) of interest. In the absence of an Outage Prediction (OP) computing tool such as that provided by the example illustrative embodiments described herein, the utility company will guess the number of outages and plan accordingly. An OP computing tool implementing the machine learning computer models according to one or more of the illustrative embodiments allows the client to plan ahead of time (e.g., 3 days ahead of time).

In performing such planning, if a storm is expected to be relatively small, the utility company would use their own crew to restore outages. This may be referred to as a mobilization level L1 for outages in the range 10-50 outages (as an example) for each region of their territory. For a medium size storm, e.g., 50-100 outages per region (level L2), the utility company may recruit some additional crew from neighboring regions (since this is not a major storm, the utility company may not have issues in all regions). For large storms, e.g., 100-200 outages per region (level L3), the utility company may recruit contractors from outside their territory, which increases the costs for the utility company to provide service. For very rare large events, like hurricanes, ice storms, and the like, where there may be greater than 200 outages per region (level L4), the utility company may recruit even more crew from outside their territory, which will increase their costs even more. By predicting the number of outages ahead of time, the utility company benefits from planning and also, avoiding unnecessary operational costs if not needed.

Based on such SME or client provided information, the model evaluation engine 226 may implement such information, from an evaluation point of view, to determine if the predicted outages generated by the ML computer model instance 220 is in the same mobilization range as the actual range (L1, L2, L3 or L4) indicated in the input dataset, e.g., in the power outage data of the training dataset 210. if the predicted level for outages is higher than the actual level of outages actually present in the input dataset 210, the ML computer model may be considered as generating a false alarm. In addition, the model evaluation engine 226 also computes, for each event, e.g., storm or other weather related event, in the training dataset 210, the mean absolute percentage error (MAPE) using the predicted (from the ML computer model instance 220) and actual values (from the input dataset 210). These values may be fed back into the model training engine 222 to adjust the operational parameters of the ML computer model instance 220 for a next iteration of the ML computer model 220 on the input dataset 210.

Once the ML computer model instances 220-240 are trained through their respective machine learning processes, which will cause the final configurations of the ML computer model instances to differ due to the different configurations of thresholds and hyperparameters of each of the ML computer model instances 220-240, the performance criteria engine 250 may operate on the evaluation and performance metrics for the final trained versions of the ML computer model instances 220-240 generated by the model evaluation engine 226 to determine how well each of the ML computer model instances 220-240 perform with regard to predetermined performance criteria 252. This predetermined performance criteria 252 may be specific to the desired implementation and may be specified by a SME, a client, or other authorized user.

For example, a business level user may specify performance criteria and preferences for performance that the business level user wishes in a final set of ML computer model instances for consideration in performing AI operations, such as generating power outage predictions based on weather factors. This performance criteria may take different forms depending on the particular implementation including specifying minimum levels of performance, specifying preferences as to one performance metric over another, or the like. For example, there may be a tradeoff between MAPE and "false alarm rate" such that the lower the MAPE, the higher the false alarm rate. Some SME, clients, or other users may lean towards a lower false alarm rate if it is at the cost of slightly higher MAPE. A higher false alarm rate means that the user may experience some unnecessary operational costs, such as requesting additional crews for handling predicted power outages which later are not actually experienced, i.e., the ML computer model may predict greater power outages than are experienced. A higher MAPE implies lower user satisfaction as the prediction accuracy will be lower.

The performance criteria engine 250 operates in conjunction with the model instance drop engine 260 which operates based on the results of the performance criteria evaluation performed by the performance criteria engine 250 to drop zero or more of the ML computer model instances 220-240 from further consideration. This dropping of ML computer model instances from further consideration may utilize various criteria for determining which ML computer model instances to drop and which to maintain. For example, default drop criteria may be defined that drops ML computer model instances that do not meet minimum requirements or that exceed maximum requirements with regard to MAPE, false alarms, or any other performance metrics. For example, the model instance drop engine 260 may automatically drop from further consideration any ML computer model instances that are considered to be substantially under performing in terms of MAPE or false alarms, e.g., if the false alarm rate is above 10% or if the MAPE across all the regions of the region group is above 60%.

The model instance drop engine 260 uses the performance criteria engine 250 evaluation results based on the predetermined performance criteria 252, e.g., importance of accuracy over false alarms, to drop ML computer model instances 220-240 that do not fit the criteria for the final ML computer model instance selection. The result is a region group listing data structure 262 of a set of ML computer model instances that meet or exceed performance criteria for that region group 202-206. The listing may specify the ML computer model instances and thus, their corresponding configurations of thresholds and hyperparameters for the particular region group.

Thus, through the operation of these elements 210-260 for each region group 202-206, a set of ML computer model instances S1, S2, and S3 are generated and provided to a model selection engine 270. The model selection engine 270 uses predetermined selection criteria, which may be specified by a SME, client, or other user along with the performance criteria 252, along with the performance evaluation results associated with the sets of ML computer model instances S1, S2, and S3 to select a final set of possible ML computer model instances across region groupings that can be deployed. For example, based on performance evaluation metrics, a top N number of ML computer model instances across the sets S1, S2, and S3 may be selected for inclusion in a final set 280 of ML computer model instances. The value of N may be any integer value, e.g., 1, 5, or the like. Thus, for example, the top performing N ML computer model instances from the sets S1, S2, and S3 with regard to MAPE and false alarm rates may be selected, with preference being specified in the performance criteria 252.

The resulting final set of one or more ML computer model instances 280 may be automatically presented to the user via one or more automatically generated dashboards 290 output on one or more client computing devices 292. The dashboards may comprise various textual and/or graphical outputs to visually represent the performance, configurations, and other characteristics of the one or more ML computer model instances in the resulting final set 280. For example, the dashboards may present various graphs, e.g., Pareto graphs, bubble graphs, or the like, showing performance characteristics of the various ML computer model instances in the final set 280 allowing for a visual inspection of performance so that the SME, client, or user can select, via a dashboard element, a ML computer model instance that meets their desired implementation. Alternatively, the performance data for the selected one or more ML computer model instances 280 may be used as a basis for automatically selecting a "best" performing ML computer model instance based on specified performance criteria, e.g., a ML computer model instance that provides a lowest false alarm rate but with a MAPE less than a predetermined amount.

Based on a user based selection or automated selection of a ML computer model instance rom the final set 280, the selected ML computer model instance 294 may be used to process new datasets 296. Thus, for example, a new dataset for a region may be obtained and input to the selected ML computer model instance 294 which then process the new dataset and generates predictions/classifications or performs other AI operations for which the ML computer model instance 294 is configured. In the case of a weather based power outage prediction application, the ML computer model instance 294 may receive a new dataset 296, similar to the training datasets 210, having weather data and infrastructure data, and may generate predictions as to power outages. This weather data may be predicted weather data from weather forecasting models, for example, so that predictions of power outages may be performed for predicted weather conditions, e.g., X number of days in the future. Based on the prediction of power outages, the SME, client, or user may then implement decision making operations, such as preparing appropriate crews, sending appropriate requests for more crews, etc., to handle the predicted power outages. That is, the ML computer model instance 294 may be part of a decision support AI computer system 296 that comprises various logic for assisting human beings in making various decisions. Thus, the ML computer model instance 294 may generate predictions which may then be operated on by other logic of the decision support AI computer system which facilitates decision making by human beings, e.g., cost projections, regional damage predictions, insurance claims predictions, etc.

Thus, the illustrative embodiments provide improved computing tool mechanisms and improved computing tool processes that automatically group regions into region groups and thereby group the corresponding training datasets into aggregated training datasets to address data sparsity issues. The illustrative embodiments further provide improved computing tool mechanisms and improved computing tool processes that automatically scale model training experiments with variabilities in the region groupings, threshold parameters, and hyperparameters. The illustrative embodiments also provide improved computing tool mechanisms and improved computing tool processes that provide for automated ML computer model instance training, execution, evaluation, selection, and presentation of selected ML computer model instance performance information for SME, client, or user review and selection of a final ML computer model instance for application to new datasets to perform an AI operation, such as prediction and/or classification.

FIG. 3 is a flowchart outlining an example operation for grouping training datasets into aggregate training datasets in accordance with one illustrative embodiment. The operation outlined in FIG. 3 may be implemented, for example, by the dataset grouping engine 100 in FIG. 1, for example.

As shown in FIG. 3, the operation starts by receiving training datasets comprising a plurality of data values from which features may be selected for input to ML computer models (step 310). For example, in the case of weatherbased ML computer models for predicting power outages, the training datasets may include daily power outage data for each geographic region for which power outage predictions are to be performed, e.g., substation, feeder, etc. The training datasets may further include daily weather variables, e.g., precipitation, ice, snow, wind gust, windspeed, temperature, soil moisture, etc. per region. Furthermore, the training datasets may include region specific data describing characteristics of the region important to modeling weather based power outages, or other characteristics for other intended predictions/classifications, such as infrastructure information.

A set of features are selected based on the input datasets and configuration of the ML computer models that are to be trained based on the input datasets (step 320). That is, configuration information may specify what features are of interest for input to the ML computer models to use as input upon which predictions or classifications are to be determined by the ML computer models. These features may include raw data from the datasets and/or may include derived values derived from the raw data of the datasets. These selected features result in a selected set of input variables V for a ML computer model.

Pair-wise correlation measurements, per selected feature $v_i$ in V, between each pair of regions $s_i$, $s_j$ in S are generated to generate a plurality of matrices $M_i$ (step 330). A single m×m matrix M is then generated by aggregating the correlation measurement values across matrices $M_i$, i.e., the aggregated correlation coefficients between $s_i$, $s_j$ for each $v_i$ in V (step 340). The resulting single matrix M is output for use in dataset group identification. The resulting single matrix M identifies, for each pair of regions $s_i$, $s_j$, an aggregated correlation measurement between these regions across all features $v_i$ in V.

The single matrix M is processed to perform grouping of regions based on the aggregated correlation measurements by optimizing the number of region groups so as to maximum a number of region groups and ensure that each region group has a minimum volume of data (step 350). The resulting set of region groups R are then output for use in defining region group datasets corresponds to the set of region groups R (step 360) and for generating, training, testing, and evaluating ML computer model instances for corresponding region groups (step 370). The operation then terminates.

Figure 4:
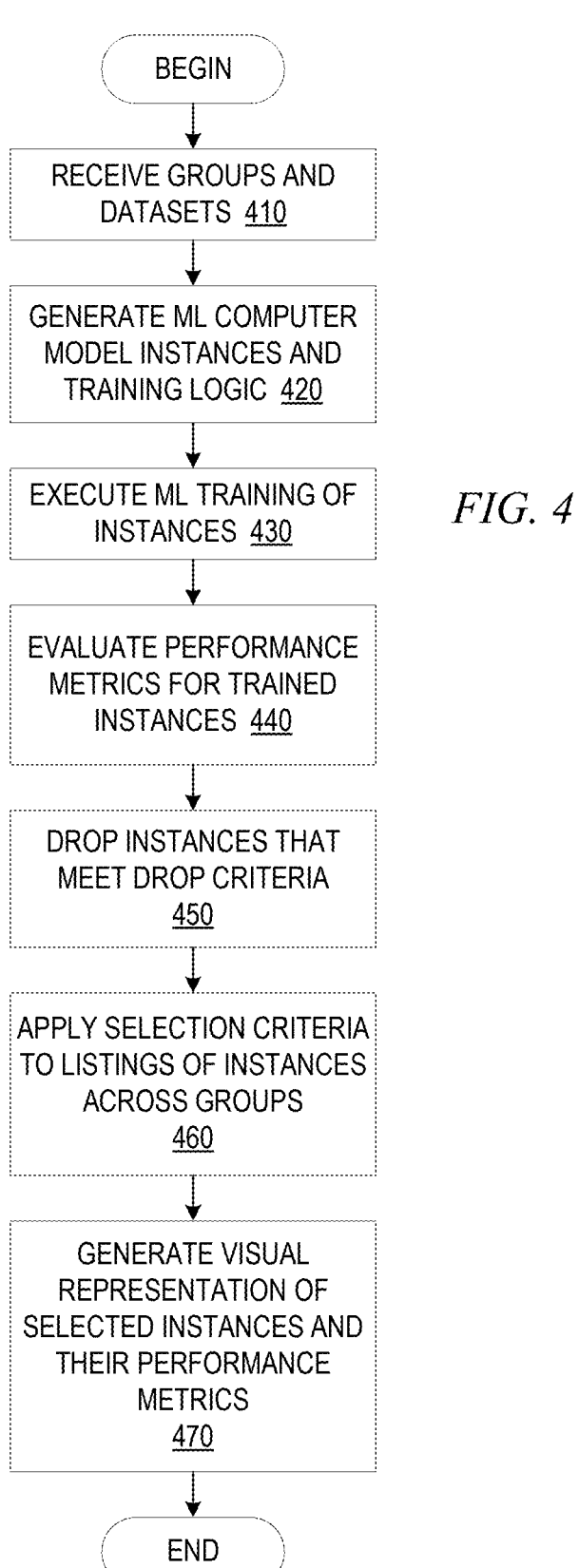
FIG. 4 is a flowchart outlining an example operation for performing machine learning computer model instance generation, training, evaluation, and selection in accordance with one illustrative embodiment.

FIG. 4 is a flowchart outlining an example operation for performing machine learning computer model instance generation, training, evaluation, and selection in accordance with one illustrative embodiment. The operation outlined in FIG. 4 may be implemented, for example, by a ML computer model selection engine 200 in FIG. 2.

As shown in FIG. 4, the operation starts by receiving region groupings R and their corresponding aggregated training datasets D, such as are generated by the mechanisms of the illustrative embodiments, such as in the manner described previously with regard to FIGS. 1 and 3 (step 410). Based on the region groupings R and the training datasets D, thresholds, and hyperparameters, a set of ML computer model training experiments are generated by generating a set of ML computer model instances and corresponding training logic instances for training and evaluating the performance of the corresponding ML computer model instances (step 420). A separate ML computer model instance is generated for each of a plurality of combinations of threshold and hyperparameter values, with the training data being common amongst each of the ML computer model instances.

Model training is executed for each of the ML computer model instances to perform machine learning functions according to a desired machine learning algorithm (step 430). This machine learning training may involve multiple iterations or epochs for each ML computer model instance including evaluations of the results generated and modification of operational parameters to improve the performance of the corresponding ML computer model instances until a desired level of performance is achieved, a predetermined number of iterations is executed, or a predetermined level of improvement is not achieved between iterations.

Once the ML computer model instances are trained through their respective machine learning processes, the evaluation and performance metrics for the final trained versions of the ML computer model instances are processed to evaluate how well each of the ML computer model instances perform with regard to predetermined performance criteria (step 440). ML computer model instances that do not meet predetermined performance criteria are dropped from further consideration and a listing of ML computer model instances for each region group is generated (step 450). Selection criteria are applied to the combined listings of the ML computer model instances across each of the region groups to generate a final set of ML computer model instances for recommendation and presentation to a SME, client, or user (step 460). The resulting final set of ML computer model instances may be automatically presented in one or more dashboards with graphical representations of the ML computer model instances and their performance metrics for consideration (step 470). The operation then terminates.

To further illustrate the operation of the improved computing tool and improved computing tool processes of the illustrative embodiments, consider a simplified example of a weather related power outage prediction AI tool, described in conjunction with FIGS. 5A-8. It should be appreciated that this example has been simplified for ease of human understanding and that the actual real-world implementation of the mechanisms of the illustrative embodiments will operate on much more complex combinations weather features, thresholds, hyperparameters, region data, and the like. For example, in an actual real-world implementation, there will be 1000 or more regions, each region having 4-5 years of historical weather data (1825 rows at daily level, or 43,800 rows at hourly level). In addition, there would be 6-8 thresholds for each wind and wind gust feature and 2 for each snow feature. Moreover, there could be 1,000 or more combinations of hyperparameters. All of these combinations would be multiplied together, resulting in millions of possible tests for training a ML computer model. This clearly is beyond human capabilities whether as mental processes or as any organization of human activity. To the contrary, the only way in which such tests can be accomplished is through an automated improved computer tool and improved computer tool operations as provided by the mechanisms of the illustrative embodiments.

In this weather related power outage prediction computer model example, examples of portions of the training datasets for two example regions is shown in FIGS. 5A and 5B. As shown in FIGS. 5A and 5B, the training datasets include valid datetime information, maximum wind gust information, maximum cumulative precipitation, maximum cumulative ice, maximum wind gust frequency for the $90^{th}$ and $93^{rd}$ percentiles, maximum snow density, number of power outages, and infrastructure data, e.g., number of power poles and length of power lines. The maximum wind gust frequency for the $90^{th}$ and $93^{rd}$ percentiles and maximum snow density values may be derived threshold values. The number of power outages may be a ground truth for comparison against predictions generated by the ML computer models.

Based on this data, as an example, a pairwise correlation for features of max_windgust, max_cumulative_precip, max_snow_density_12, max_cumulative_ice, and number of power outages may be performed to generate a pairwise correlation calculation and generate five matrices of correlations which may then be aggregated to generate possible region groupings, such as shown in FIG. 6. In the grouping matrix of FIG. 6, the values indicated a correlation coefficient, or distance metric, for the corresponding regions indicated by region ID. In the depicted example, a first grouping result is determined that includes two groups A (regions 1-7) and B (regions 8-10), and a second grouping result that includes three groups A (regions 1-4), B (regions 5-6), and C (regions 7-10).

Based on the generated groupings, a set of ML computer model instances, or experiments, are generated as shown in FIG. 7. In the example shown in FIG. 7, 32 different ML computer model instances or experiments are generated for the region groupings. The ML computer model instances are generated based on combinations of thresholds for wind gust frequency and snow density, e.g., windgust_freq_$90^{th}$, windgust_freq_93th, max_snow_density_6, and max_snow_density_12, as well as hyperparameters, such as minimum sample leaf values of 2 and 3, and sample weight factors of 0 and 0.1, assuming a random forest ML algorithm.

FIG. 7 further illustrates performance metrics generated for the various ML computer model instances after training, including MAPE and false alarm rates. In accordance with this example, the performance metrics are used to drop ML computer model instances that do not meet minimum threshold performance requirements or that exceed thresholds. For example, those ML computer model instances that have false alarm rates higher than 15% may be automatically dropped from further consideration, e.g., ML computer model instances 1-5 and 22-25.

Figure 8:
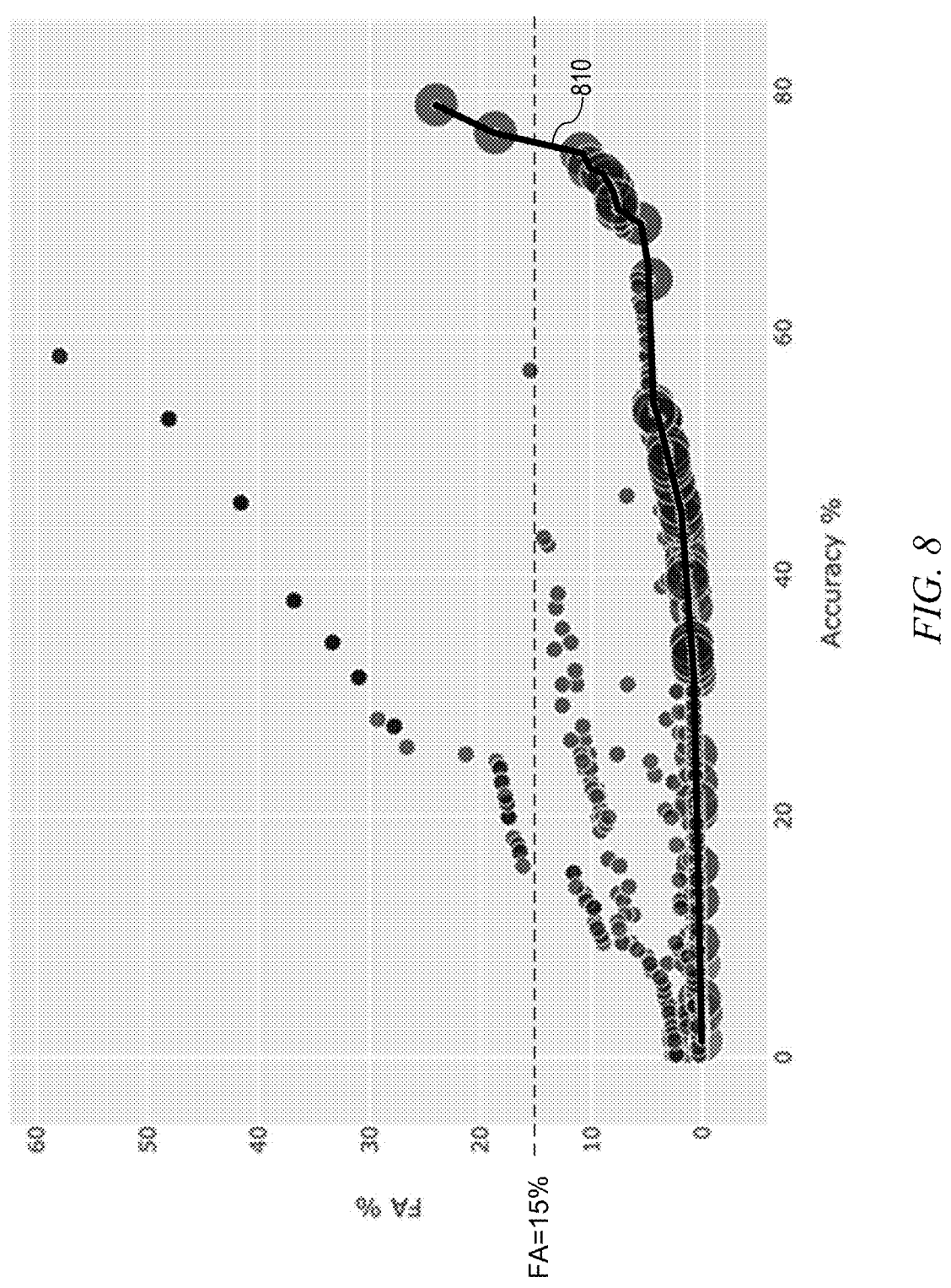
FIG. 8 is an example graph of performance metrics for various ML computer model instances in accordance with one illustrative embodiment.

The remaining ML computer model instances may be selected as a final set of ML computer model instances for presentation in one or more dashboards for human consideration. For example, a Pareto graph or bubble graph may be generated to visually represent a trade-off between accuracy (1-MAPE) and false alarm for each of the remaining ML computer model instances. An example of such a bubble graph is shown in FIG. 8. In the example of FIG. 8, each bubble represents a different ML computer model instance in the final set. The bubbles in the graph may be colored or otherwise visually represented to indicate hyperparameter or weather feature thresholds. In the depicted example, a Pareto frontier may be calculated and shown as line 810. A user may then interface with the dashboard to select a ML computer model instance from the Pareto frontier having a false alarm rate smaller than 15%, for example.

Thus, the illustrative embodiments provide an improved computing tool and improved computing tool process that facilitates automated grouping of datasets into aggregate datasets to address sparsity of data in the datasets, especially with regard to weather related features in the example embodiments. The illustrative embodiments further provide mechanisms of the improved computing tool and improved computing tool process to automatically generate, train, execute, evaluate, and select ML computer model instances for potential use. Moreover, the illustrative embodiments provide mechanisms to visualize the ML computer model instances and their performance for aiding a user in selecting a ML computer model instance for implementation in a decision support computing system to perform AI operations.

Figure 9:
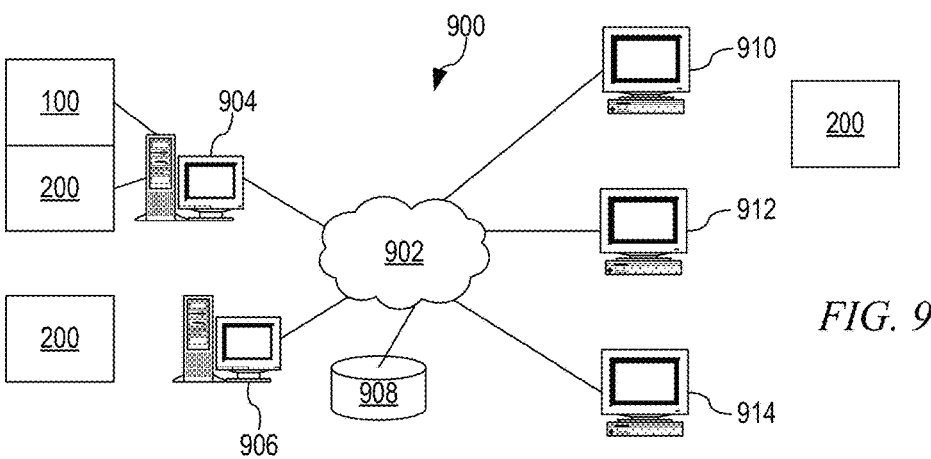
FIG. 9 is an example diagram of a distributed data processing system in which aspects of the illustrative embodiments may be implemented.
Figure 10:
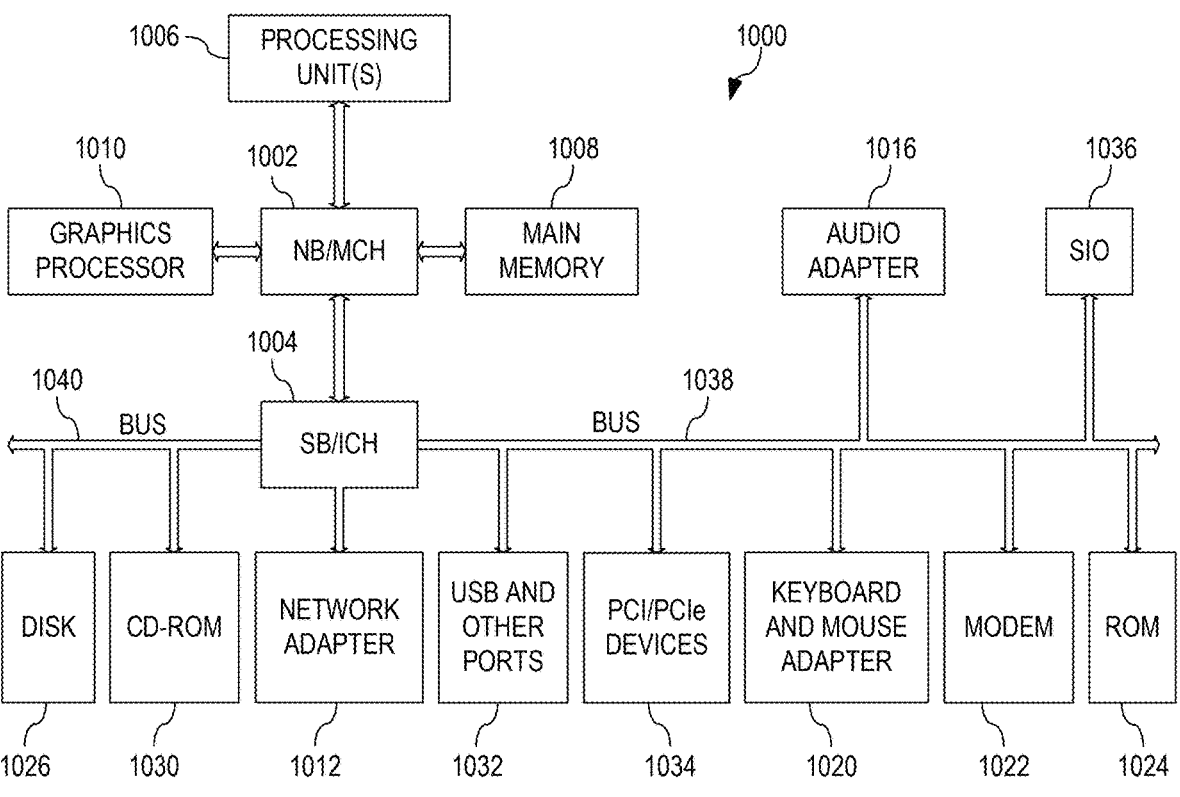
FIG. 10 is an example block diagram of a computing device in which aspects of the illustrative embodiments may be implemented.

The illustrative embodiments may be utilized in many different types of data processing environments. In order to provide a context for the description of the specific elements and functionality of the illustrative embodiments, FIGS. 9 and 10 are provided hereafter as example environments in which aspects of the illustrative embodiments may be implemented. It should be appreciated that FIGS. 9 and 10 are only examples and are not intended to assert or imply any limitation with regard to the environments in which aspects or embodiments of the present invention may be implemented. Many modifications to the depicted environments may be made without departing from the spirit and scope of the present invention.

FIG. 9 depicts a pictorial representation of an example distributed data processing system in which aspects of the illustrative embodiments may be implemented. Distributed data processing system 900 may include a network of computers in which aspects of the illustrative embodiments may be implemented. The distributed data processing system 900 contains at least one network 902, which is the medium used to provide communication links between various devices and computers connected together within distributed data processing system 900. The network 902 may include connections, such as wire, wireless communication links, or fiber optic cables.

In the depicted example, server 904 and server 906 are connected to network 902 along with storage unit 908. In addition, clients 910, 912, and 914 are also connected to network 902. These clients 910, 912, and 914 may be, for example, personal computers, network computers, or the like. In the depicted example, server 904 provides data, such as boot files, operating system images, and applications to the clients 910, 912, and 914. Clients 910, 912, and 914 are clients to server 904 in the depicted example. Distributed data processing system 900 may include additional servers, clients, and other devices not shown.

In the depicted example, distributed data processing system 900 is the Internet with network 902 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, the distributed data processing system 900 may also be implemented to include a number of different types of networks, such as for example, an intranet, a local area network (LAN), a wide area network (WAN), or the like. As stated above, FIG. 9 is intended as an example, not as an architectural limitation for different embodiments of the present invention, and therefore, the particular elements shown in FIG. 9 should not be considered limiting with regard to the environments in which the illustrative embodiments of the present invention may be implemented.

As shown in FIG. 9, one or more of the computing devices, e.g., server 904, may be specifically configured to implement a dataset grouping engine 100 and a ML computer model selection engine 200. The ML computer model selection engine 200 may generate a final set of ML computer model instances that may be presented to a SME, client, or user, such as via a dashboard of other graphical user interface output on a client computing device 910, for example, which may include providing graphs and/or other representations of ML computer model instances and corresponding performance information, such as an example of a bubble graph like that in FIG. 8. Moreover, one or more of the computing devices, e.g., server 906, may be specifically configured to implement a decision support AI computer system 920 to which one or more selected ML computer models 922 selected via the ML computer model selection engine may be deployed for use in runtime analysis of datasets and performance of AI decision support operations, such as generating predictions and/or classifications that serve as a basis for the AI decision support operations. For example, in the context of a weather based power outage ML computer model, the ML computer model may operate to process an input dataset comprising weather features and infrastructure features for a region of interest and predict power outages based on these weather features and infrastructure features. The decision support computing system may then use the predictions to perform operations for preparing for the predicted power outages, e.g., allocating utility company crews and equipment, sending requests for additional crews/equipment, sending requests to lower power utilization, sending notifications to authorities and/or residents/business that may be affected by the power outages, etc.

The configuring of the computing devices may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 904, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described herein, the implementation of the mechanisms of the illustrative embodiments improves the functionality of the computing device and provides a useful and concrete result that facilitates automated grouping of datasets and ML computer model experimentation, evaluation, and selection for use in deployment to a decision support computing system for performing decision support AI operations.

As noted above, the mechanisms of the illustrative embodiments utilize specifically configured computing devices, or data processing systems, to perform the operations for automatically generating aggregated dataset groups and utilizing these aggregated dataset groups and combinations of thresholds and hyperparameters to generate, execute, evaluate, and select ML computer model instances for deployment to an AI decision support computing system. These computing devices, or data processing systems, may comprise various hardware elements which are specifically configured, either through hardware configuration, software configuration, or a combination of hardware and software configuration, to implement one or more of the systems/subsystems described herein. FIG. 10 is a block diagram of just one example data processing system in which aspects of the illustrative embodiments may be implemented. Data processing system 1000 is an example of a computer, such as server 904 in FIG. 9, in which computer usable code or instructions implementing the processes and aspects of the illustrative embodiments of the present invention may be located and/or executed so as to achieve the operation, output, and external effects of the illustrative embodiments as described herein.

In the depicted example, data processing system 1000 employs a hub architecture including north bridge and memory controller hub (NB/MCH) 1002 and south bridge and input/output (I/O) controller hub (SB/ICH) 1004. Processing unit 1006, main memory 1008, and graphics processor 1010 are connected to NB/MCH 1002. Graphics processor 1010 may be connected to NB/MCH 1002 through an accelerated graphics port (AGP).

In the depicted example, local area network (LAN) adapter 1012 connects to SB/ICH 1004. Audio adapter 1016, keyboard and mouse adapter 1020, modem 1022, read only memory (ROM) 1024, hard disk drive (HDD) 1026, CD-ROM drive 1030, universal serial bus (USB) ports and other communication ports 1032, and PCI/PCIe devices 1034 connect to SB/ICH 1004 through bus 1038 and bus 1040. PCI/PCIe devices may include, for example, Ethernet adapters, add-in cards, and PC cards for notebook computers. PCI uses a card bus controller, while PCIe does not. ROM 1024 may be, for example, a flash basic input/output system (BIOS).

HDD 1026 and CD-ROM drive 1030 connect to SB/ICH 1004 through bus 1040. HDD 1026 and CD-ROM drive 1030 may use, for example, an integrated drive electronics (IDE) or serial advanced technology attachment (SATA) interface. Super I/O (SIO) device 1036 may be connected to SB/ICH 1004.

An operating system runs on processing unit 1006. The operating system coordinates and provides control of various components within the data processing system 1000 in FIG. 10. As a client, the operating system may be a commercially available operating system such as Microsoft® Windows 10®. An object-oriented programming system, such as the java™ programming system, may run in conjunction with the operating system and provides calls to the operating system from Java™ programs or applications executing on data processing system 1000.

As a server, data processing system 1000 may be, for example, an IBM eServer™ System p® computer system, Power™ processor based computer system, or the like, running the Advanced Interactive Executive (AIX®) operating system or the LINUX® operating system. Data processing system 1000 may be a symmetric multiprocessor (SMP) system including a plurality of processors in processing unit 1006. Alternatively, a single processor system may be employed.

Instructions for the operating system, the object-oriented programming system, and applications or programs are located on storage devices, such as HDD 1026, and may be loaded into main memory 1008 for execution by processing unit 1006. The processes for illustrative embodiments of the present invention may be performed by processing unit 1006 using computer usable program code, which may be located in a memory such as, for example, main memory 1008, ROM 1024, or in one or more peripheral devices 1026 and 1030, for example.

A bus system, such as bus 1038 or bus 1040 as shown in FIG. 10, may be comprised of one or more buses. Of course, the bus system may be implemented using any type of communication fabric or architecture that provides for a transfer of data between different components or devices attached to the fabric or architecture. A communication unit, such as modem 1022 or network adapter 1012 of FIG. 10, may include one or more devices used to transmit and receive data. A memory may be, for example, main memory 1008, ROM 1024, or a cache such as found in NB/MCH 1002 in FIG. 10.

As mentioned above, in some illustrative embodiments the mechanisms of the illustrative embodiments may be implemented as application specific hardware, firmware, or the like, application software stored in a storage device, such as HDD 1026 and loaded into memory, such as main memory 1008, for executed by one or more hardware processors, such as processing unit 1006, or the like. As such, the computing device shown in FIG. 10 becomes specifically configured to implement the mechanisms of the illustrative embodiments and specifically configured to perform the operations and generate the outputs described herein with regard to the dataset grouping engine 100 and a ML computer model selection engine 200.

Those of ordinary skill in the art will appreciate that the hardware in FIGS. 9 and 10 may vary depending on the implementation. Other internal hardware or peripheral devices, such as flash memory, equivalent non-volatile memory, or optical disk drives and the like, may be used in addition to or in place of the hardware depicted in FIGS. 9 and 10. Also, the processes of the illustrative embodiments may be applied to a multiprocessor data processing system, other than the SMP system mentioned previously, without departing from the spirit and scope of the present invention.

Moreover, the data processing system 1000 may take the form of any of a number of different data processing systems including client computing devices, server computing devices, a tablet computer, laptop computer, telephone or other communication device, a personal digital assistant (PDA), or the like. In some illustrative examples, data processing system 1000 may be a portable computing device that is configured with flash memory to provide non-volatile memory for storing operating system files and/or user-generated data, for example. Essentially, data processing system 1000 may be any known or later developed data processing system without architectural limitation.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for automatically generating a machine learning (ML) computer model, the method comprising:

automatically generating a plurality of aggregated dataset groups, wherein each aggregated dataset group comprises one or more original datasets, of a plurality of original datasets, grouped together based on a predetermined quantity of weather events in the one or more original datasets to generate an aggregated dataset, wherein the plurality of original datasets comprise weather data and power outage data;

automatically generating, for each aggregated dataset group in the plurality of aggregated dataset groups, a plurality of ML computer model instances, wherein each ML computer model instance in the plurality of ML computer model instances for the aggregated dataset group is generated by configuring a ML computer model with a different combination of thresholds and hyperparameters than other ML computer model instances in the plurality of ML computer model instances for the aggregated dataset group;

executing the plurality of ML computer model instances, for each aggregated dataset group, to generate predictions of power outages due to weather conditions and performance metric information for each ML computer model instance;

evaluating the performance metric information for each ML computer model instance to select a set of ML computer model instances from the plurality of ML computer model instances for the aggregated dataset such that each aggregated dataset has an associated set of ML computer model instances; and selecting one or more ML computer model instances from across all of the sets of ML computer model instances as a candidate for deployment to a decision support computing system, wherein the one or more ML computer model instances are configured to generate one or more region of interest power outage predictions as a basis for one or more operations comprising:

sending one or more requests for resource allocations to prepare for power outages, sending one or more requests to lower power utilization, or sending one or more notifications to authorities, residents or businesses to prepare for power outages.

2. The method of claim 1, wherein automatically generating a plurality of aggregated dataset groups comprises generating a pairwise correlation matrix data structure having entries corresponding to pairings of original datasets in the plurality of original datasets and specifies a corresponding degree of correlation between one or more features of the original datasets generated from raw data of the original datasets in each pairing.

3. The method of claim 2, wherein automatically generating a plurality of aggregated dataset groups further comprises, for each pairing, aggregating degrees of correlation across the one or more features to generate a single degree of correlation between the original datasets in the pairing to generate an aggregate correlation matrix data structure, and performing clustering of the original datasets based on the degrees of correlation specified in the aggregate correlation matrix data structure.

4. The method of claim 1, wherein automatically generating a plurality of ML computer model instances comprises, for each aggregated dataset group, performing machine learning training of one or more corresponding ML computer model instances based on an aggregated dataset corresponding to the aggregated dataset group to thereby generate one or more trained ML computer model instances for the aggregated dataset group.

5. The method of claim 4, wherein each ML computer model instance is a Docker image comprising the aggregated dataset and a trained ML computer model.

6. The method of claim 5, wherein each aggregated dataset group comprises a Docker container for a plurality of Docker images corresponding to the plurality of ML computer model instances.

7. The method of claim 1, wherein: the ML computer model is a weather based power outage prediction ML computer model that is configured to predict power outages in geographical regions due to weather events, the plurality of original datasets comprise historical weather data for a set of geographical regions, each original dataset in the plurality of original datasets being associated with a different geographical region in the set of geographical regions, and the aggregated dataset groups correspond to aggregated geographical regions, wherein at least one aggregated geographical region comprises a plurality of geographical regions in the set of geographical regions.

8. The method of claim 7, wherein the historical weather data comprises historical weather characteristics comprising precipitation data, snowfall data, ice accumulation data, wind speed data, wind gust data, and temperature data for a corresponding geographical region, and wherein a degree of correlation between an original dataset corresponding to the corresponding geographical region and other original datasets in the plurality of original datasets comprises calculations, for each historical weather characteristic, of a degree of correlation between that historical weather characteristic for the corresponding geographical region and a same historical weather characteristic of original datasets corresponding to each other geographical region in the set of geographical regions.

9. The method of claim 7, wherein a degree of correlation is determined based on geographical distance between geographical regions and correlations between historical weather data for geographical regions.

10. The method of claim 1, wherein the hyperparameters are data values defining parameters of a machine learning algorithm employed by the ML computer model instance, and wherein the thresholds are data values derived from statistical analysis of historical trends of input features, used to generate input features to the ML computer model instance.

11. A computer program product comprising a non-transitory computer readable storage medium having a computer readable program stored therein, wherein the computer readable program, when executed on a computing device, causes the computing device to:

automatically generate a plurality of aggregated dataset groups, wherein each aggregated dataset group comprises one or more original datasets, of a plurality of original datasets, grouped together based on a predetermined quantity of weather events in the one or more original data sets to generate an aggregated dataset, wherein the plurality of original datasets comprise weather data and power outage data;

automatically generate, for each aggregated dataset group in the plurality of aggregated dataset groups, a plurality of ML computer model instances, wherein each ML computer model instance in the plurality of ML computer model instances for the aggregated dataset group is generated by configuring a ML computer model with a different combination of thresholds and hyperparameters than other ML computer model instances in the plurality of ML computer model instances for the aggregated dataset group;

execute the plurality of ML computer model instances, for each aggregated dataset group, to generate predictions of power outages due to weather conditions and performance metric information for each ML computer model instance;

evaluate the performance metric information for each ML computer model instance to select a set of ML computer model instances from the plurality of ML computer model instances for the aggregated dataset such that each aggregated dataset has an associated set of ML computer model instances; and select one or more ML computer model instances from across all of the sets of ML computer model instances as a candidate for deployment to a decision support computing system, wherein the one or more ML computer model instances are configured to generate one or more region of interest power outage predictions as a basis for one or more operations comprising:

sending one or more requests for resource allocations to prepare for power outages, sending one or more requests to lower power utilization, or sending one or more notifications to authorities, residents or businesses to prepare for power outages.

12. The computer program product of claim 11, wherein automatically generating a plurality of aggregated dataset groups comprises generating a pairwise correlation matrix data structure having entries corresponding to pairings of original datasets in the plurality of original datasets and specifies a corresponding degree of correlation between one or more features of the original datasets generated from raw data of the original datasets in each pairing.

13. The computer program product of claim 12, wherein automatically generating a plurality of aggregated dataset groups further comprises, for each pairing, aggregating degrees of correlation across the one or more features to generate a single degree of correlation between the original datasets in the pairing to generate an aggregate correlation matrix data structure, and performing clustering of the original datasets based on the degrees of correlation specified in the aggregate correlation matrix data structure.

14. The computer program product of claim 11, wherein automatically generating a plurality of ML computer model instances comprises, for each aggregated dataset group, performing machine learning training of one or more corresponding ML computer model instances based on an aggregated dataset corresponding to the aggregated dataset group to thereby generate one or more trained ML computer model instances for the aggregated dataset group.

15. The computer program product of claim 14, wherein each ML computer model instance is a Docker image comprising the aggregated dataset and a trained ML computer model.

16. The computer program product of claim 15, wherein each aggregated dataset group comprises a Docker container for a plurality of Docker images corresponding to the plurality of ML computer model instances.

17. The computer program product of claim 11, wherein:

the ML computer model is a weather based power outage prediction ML computer model that is configured to predict power outages in geographical regions due to weather events, the plurality of original datasets comprise historical weather data for a set of geographical regions, each original dataset in the plurality of original datasets being associated with a different geographical region in the set of geographical regions, and the aggregated dataset groups correspond to aggregated geographical regions, wherein at least one aggregated geographical region comprises a plurality of geographical regions in the set of geographical regions.

18. The computer program product of claim 17, wherein the historical weather data comprises historical weather characteristics comprising precipitation data, snowfall data, ice accumulation data, wind speed data, wind gust data, temperature data, and power outage counts for a corresponding geographical region, and wherein a degree of correlation between an original dataset corresponding to the corresponding geographical region and other original datasets in the plurality of original datasets comprises calculations, for each historical weather characteristic, of a degree of correlation between that historical weather characteristic for the corresponding geographical region and a same historical weather characteristic of original datasets corresponding to each other geographical region in the set of geographical regions.

19. The computer program product of claim 11, wherein the hyperparameters are data values defining parameters of a machine learning algorithm employed by the ML computer model instance, and wherein the thresholds are data values derived from statistical analysis of historical trends of input features, used to generate input features to the ML computer model instance.

20. An apparatus comprising:

at least one processor; and at least one memory coupled to the at least one processor, wherein the at least one memory comprises instructions which, when executed by the at least one processor, cause the at least one processor to:

automatically generate a plurality of aggregated dataset groups, wherein each aggregated dataset group comprises one or more original datasets, of a plurality of original datasets, grouped together based on a predetermined quantity of weather events in the one or more original datasets to generate an aggregated dataset, wherein the plurality of original datasets comprise weather data and power outage data;

automatically generate, for each aggregated dataset group, a plurality of ML computer model instances, wherein each ML computer model instance in the plurality of ML computer model instances for the aggregated dataset group is generated by configuring a ML computer model with a different combination of thresholds and hyperparameters than other ML computer model instances in the plurality of ML computer model instances for the aggregated dataset group;

execute the plurality of ML computer model instances, for each aggregated dataset group in the plurality of aggregated dataset groups, to generate predictions of power outages due to weather conditions and performance metric information for each ML computer model instance;

evaluate the performance metric information for each ML computer model instance to select a set of ML computer model instances from the plurality of ML computer model instances for the aggregated dataset such that each aggregated dataset has an associated set of ML computer model instances; and select one or more ML computer model instances from across all of the sets of ML computer model instances as a candidate for deployment to a decision support computing system, wherein the one or more ML computer model instances are configured to generate one or more region of interest power outage predictions as a basis for one or more operations comprising:

sending one or more requests for resource allocations to prepare for power outages, sending one or more requests to lower power utilization, or sending one or more notifications to authorities, residents or businesses to prepare for power outages.

* * * * *